United States Patent
Fujita et al.

(10) Patent No.: US 7,096,482 B2
(45) Date of Patent: Aug. 22, 2006

(54) BROADCASTING APPARATUS, BROADCASTING METHOD, PROGRAM RECORDING MEDIUM, AND PROGRAM

(75) Inventors: Kimikazu Fujita, Moriguchi (JP); Akihiro Tanaka, Moriguchi (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 1020 days.

(21) Appl. No.: 09/901,258

(22) Filed: Jul. 9, 2001

(65) Prior Publication Data

US 2002/0010939 A1    Jan. 24, 2002

(30) Foreign Application Priority Data

Jul. 17, 2000    (JP)    ............................. 2000-216568

(51) Int. Cl.
  *H04N 7/10*    (2006.01)
  *H04N 7/025*    (2006.01)

(52) U.S. Cl. ........................... 725/32; 725/34; 725/142

(58) Field of Classification Search .................. 725/32, 725/36; 455/418
  See application file for complete search history.

(56) References Cited

U.S. PATENT DOCUMENTS 6,401,243 B1 *  6/2002  Suzuki ........................ 725/86
6,615,039 B1 *  9/2003  Eldering ...................... 455/418
6,704,930 B1 *  3/2004  Eldering et al. .............. 725/36
6,820,277 B1 * 11/2004  Eldering et al. .............. 725/35

FOREIGN PATENT DOCUMENTS

| EP | 827340 | 3/1998 |
| GB | 2272616 | 5/1994 |
| JP | 5252123 | 9/1993 |
| JP | 2000101528 | 4/2000 |

* cited by examiner

Primary Examiner—Vivek Srivastava
Assistant Examiner—Justin Shepard

(57) ABSTRACT

The contents transmission scheduling unit 103 prepares a transmission schedule so that contents data of CM1, CM2, and CM3 as the cache target programs are transmitted prior to the starting time of the reproduction time periods of these programs. The contents transmission scheduling unit 103 prepares the transmission schedule so that the contents data of the cache target programs are transmitted using a narrow bandwidth in a time period a predetermined time period before the starting time of the reproduction time periods of these programs, and the bandwidth is widen after the time period.

9 Claims, 32 Drawing Sheets

FIG. 3

| BROADCASTING DATE | CHANNEL CODE | PROGRAM MANAGEMENT CODE | PROGRAM TITLE | STARTING TIME OF PROGRAM | FINISHING TIME OF PROGRAM | AUDIOVISUAL MANAGEMENT CODE | CONTENTS MANAGEMENT CODE |
|---|---|---|---|---|---|---|---|
| 2000/1/1 | 10 | 1001 | PROGRAM A | 8:00:00 | 8:14:00 | AV1001 | C1001 |
| | | 1002 | CM1 | 8:14:00 | 8:15:00 | AV1002 | C1002 |
| | | 1003 | CM2 | 8:15:00 | 8:16:00 | AV1003 | C1003 |
| | | 1001 | PROGRAM A | 8:16:00 | 8:34:00 | AV1004 | C1004 |
| | | 1004 | CM3 | 8:34:00 | 8:35:00 | AV1005 | C1005 |

FIG. 4

| BROADCASTING DATE | CHANNEL CODE | AUDIOVISUAL MANAGEMENT CODE | STARTING TIME OF PROGRAM | FINISHING TIME OF PROGRAM |
|---|---|---|---|---|
| 2000/1/1 | 10 | AV1001 | 8 : 00 : 00 | 8 : 14 : 00 |
| | | AV1002 | 8 : 14 : 00 | 8 : 15 : 00 |
| | | AV1003 | 8 : 15 : 00 | 8 : 16 : 00 |
| | | AV1004 | 8 : 16 : 00 | 8 : 34 : 00 |
| | | AV1005 | 8 : 34 : 00 | 8 : 35 : 00 |

FIG. 5

| BROADCASTING DATE | CHANNEL CODE | TRANSMISSION TIME | CONTENTS MANAGEMENT CODE (TRANSMISSION BANDWIDTH) | | |
|---|---|---|---|---|---|
| 2000/1/1 | 10 | 8:00:00~8:13:50 | C1001(0.7D) | C1002(0.1D) | C1005(0.1D) |
| | | 8:13:50~8:14:00 | C1001(0.25D) | C1002(0.55D) | C1005(0.1D) |
| | | 8:14:00~8:14:50 | S1001(0.05D) | C1002(0.75D) | C1005(0.1D) |
| | | 8:14:50~8:15:00 | S1001(0.05D) | C1002(0.2D) | C1005(0.1D) |
| | | 8:15:00~8:16:00 | S1002(0.05D) | C1003(0.85D) | C1005(0.1D) |
| | | 8:16:00~8:33:50 | C1004(0.9D) | C1005(0.1D) | |
| | | 8:33:50~8:34:00 | C1004(0.25D) | C1005(0.75D) | |
| | | 8:34:00~8:35:00 | S1003(0.05D) | C1005(0.95D) | |

FIG. 7

| CONTENTS MANAGEMENT CODE | DATA MODULE |
|---|---|
| C1001 | DATA MODULE WITH ID=0 |
| C1002 | DATA MODULE WITH ID=1 |
| C1003 | DATA MODULE WITH ID=2 |
| C1005 | DATA MODULE WITH ID=3 |
| C1004 | DATA MODULE WITH ID=0 |
| S1001 | DATA MODULE WITH ID=0 |
| S1002 | DATA MODULE WITH ID=0 |
| S1003 | DATA MODULE WITH ID=0 |

FIG. 8

| BROADCASTING DATE | CHANNEL CODE | CONTENTS MANAGEMENT CODE | MESSAGE TYPE | TRANSMISSION TIME |
|---|---|---|---|---|
| 2000/1/1 | 10 | C1002 | REPRODUCTION | 8:14:00 |
| | | C1002 | DELETION | 8:15:00 |
| | | C1003 | REPRODUCTION | 8:15:00 |
| | | C1003 | DELETION | 8:16:00 |
| | | C1005 | REPRODUCTION | 8:34:00 |
| | | C1005 | DELETION | 8:35:00 |

FIG. 9

| 0-1 | 0-2 | 0-3 | 0-4 | 0-5 | 0-6 | 0-7 | 1-1 | 2-1 | 3-1 |
|---|---|---|---|---|---|---|---|---|---|
| 0-8 | 0-9 | 0-10 | 0-11 | 0-12 | 0-13 | 0-14 | 1-2 | 2-2 | 3-2 |
| 0-15 | 0-16 | 0-17 | 0-18 | 0-19 | 0-20 | 0-22 | 1-3 | 2-3 | 3-3 |
| 0-22 | 0-23 | 0-24 | 0-25 | 0-26 | 0-27 | 0-28 | 1-4 | 2-4 | 3-4 |
| 0-29 | 0-30 | 0-1 | 0-2 | 0-3 | 0-4 | 0-5 | 1-1 | 2-5 | 3-5 |
| 0-6 | 0-7 | 0-8 | 0-9 | 0-10 | 0-11 | 0-12 | 1-2 | 2-1 | 3-1 |
| 0-13 | | | | ↑ | ↑ | ↑ | ↑ | ↑ | |
| 0-25 | 0-26 | 0-27 | 0-28 | 0-29 | 1-3 | 1-4 | 1-1 | 1-2 | 1-3 |
| 1-4 | 1-1 | 1-2 | 1-3 | 1-4 | 1-1 | 2-4 | 2-5 | 3-4 | 3-1 |
| 0-30 | 0-1 | 0-2 | 0-3 | 0-4 | 1-2 | 1-3 | 1-4 | 1-1 | 1-2 |
| 1-3 | 1-4 | 1-1 | 1-2 | 1-3 | 1-4 | 2-1 | 2-2 | 3-2 | 3-3 |
| 0-5 | | | | | | | | | |

| BROADCASTING DATE | CHANNEL CODE | TRANSMISSION TIME | CONTENTS CODE (TRANSMISSION BANDWIDTH) | | |
|---|---|---|---|---|---|
| 2000/1/1 | 10 | 8:00:00~8:14:00 | C1001(0.7D) C1002(0.1D) | | |
| | | 8:14:00~8:15:50 | S1001(0.05D) C1002(0.75D) C1003(0.1D) C1005(0.1D) | | |
| | | 8:15:00~8:16:00 | S1002(0.05D) C1003(0.85D) C1003(0.1D) C1005(0.1D) | | |
| | | 8:16:00~8:34:00 | C1004(0.9D) C1005(0.1D) | | |
| | | 8:34:00~8:35:00 | S1003(0.05D) C1005(0.95D) | | |

FIG. 18

| BROADCASTING DATE | CHANNEL CODE | TRANSMISSION TIME | CONTENTS MANAGEMENT CODE (TRANSMISSION BANDWIDTH) | | |
|---|---|---|---|---|---|
| 2000/1/1 | 10 | 8:00:00 ~ 8:13:50 | C1001(0.7D) | C1002(0.1D) | C1005(0.1D) |
| | | 8:13:50 ~ 8:14:00 | C1001(0.25D) | C1002(0.55D) | C1005(0.1D) |
| | | 8:14:00 ~ 8:14:50 | S1001(0.05D) | C1002(0.75D) | C1005(0.1D) |
| | | 8:14:50 ~ 8:15:00 | S1001(0.05D) | C1002(0.3D) | C1005(0.1D) |
| | | 8:15:00 ~ 8:15:50 | S1002(0.05D) | C1002(0.1D) | C1005(0.1D) |
| | | 8:16:00 ~ 8:33:50 | C1004(0.7D) | C1003(0.1D) | C1005(0.1D) |
| | | 8:33:50 ~ 8:34:00 | C1004(0.25D) | C1003(0.55D) | C1005(0.1D) |
| | | 8:34:00 ~ 8:35:00 | S1003(0.05D) | C1003(0.75D) | C1005(0.1D) |

FIG. 20

| BROADCASTING DATE | CHANNEL CODE | TRANSMISSION TIME | | CONTENTS MANAGEMENT CODE (TRANSMISSION BANDWIDTH) | | |
|---|---|---|---|---|---|---|
| 2000/1/1 | 10 | 8:00:00~8:14:00 | C1001(0.7D) | C1002(0.1D) | C1003(0.1D) | C1005(0.1D) |
| | | 8:14:00~8:15:00 | S1001(0.05D) | C1002(0.75D) | C1003(0.1D) | C1005(0.1D) |
| | | 8:15:00~8:15:50 | S1002(0.05D) | C1002(0.1D) | C1003(0.75D) | C1005(0.1D) |
| | | 8:16:00~8:34:00 | C1004(0.7D) | C1002(0.1D) | C1003(0.1D) | C1005(0.1D) |
| | | 8:34:00~8:35:00 | S1003(0.05D) | C1002(0.1D) | C1003(0.1D) | C1005(0.75D) |

FIG. 22

| BROADCASTING DATE | CHANNEL CODE | TRANSMISSION TIME | | CONTENTS MANAGEMENT CODE (TRANSMISSION BANDWIDTH) | | |
|---|---|---|---|---|---|---|
| 2000/1/1 | 10 | 8:00:00~8:13:50 | C1001(0.7D) | RC1002(0.1D) | RC1003(0.1D) | |
| | | 8:13:50~8:14:00 | C1001(0.25D) | NC1002(0.45D) | RC1002(0.1D) | RC1005(0.1D) |
| | | 8:14:00~8:14:50 | S1001(0.05D) | NC1002(0.75D) | RC1003(0.1D) | RC1005(0.1D) |
| | | 8:14:50~8:15:00 | S1001(0.05D) | NC1002(0.2D) | RC1003(0.1D) | RC1005(0.1D) |
| | | 8:15:00~8:16:00 | S1002(0.05D) | NC1003(0.85D) | NC1003(0.55D) | |
| | | 8:16:00~8:33:50 | C1004(0.9D) | RC1005(0.1D) | | |
| | | 8:33:50~8:34:00 | C1004(0.25D) | NC1005(0.65D) | RC1005(0.1D) | |
| | | 8:34:00~8:35:00 | S1003(0.05D) | NC1005(0.95D) | | |

FIG. 24

| BROADCASTING DATE | CHANNEL CODE | TRANSMISSION TIME | CONTENTS MANAGEMENT CODE (TRANSMISSION BANDWIDTH) | | |
|---|---|---|---|---|---|
| 2000/1/1 | 10 | 8:00:00~8:13:50 | C1001(0.8D) | C1002(0.1D) | C1003(0.1D) |
| | | 8:13:50~8:14:00 | C1001(0.2D) | C1002(0.7D) | C1003(0.1D) |
| | | 8:14:00~8:14:50 | C1002(0.9D) | C1003(0.1D) | |
| | | 8:14:50~8:15:00 | C1002(0.5D) | C1003(0.5D) | |
| | | 8:15:00~8:16:00 | C1003(1D) | | |
| | | 8:16:00~8:33:50 | C1004(0.9D) | C1005(0.1D) | |
| | | 8:33:50~8:34:00 | C1004(0.2D) | C1005(0.8D) | |
| | | 8:34:00~8:35:00 | C1005(1D) | | |

FIG. 26

| BROADCASTING DATE | CHANNEL CODE | TRANSMISSION TIME | CONTENTS MANAGEMENT CODE (TRANSMISSION BANDWIDTH) | | |
|---|---|---|---|---|---|
| 2000/1/1 | 10 | 8:00:00~8:13:50 | C1001(0.8D) | | |
| | | 8:13:50~8:14:00 | C1001(0.2D) | C1002(0.7D) | C1003(0.1D) |
| | | 8:14:00~8:14:50 | C1002(0.9D) | C1003(0.1D) | |
| | | 8:14:50~8:15:00 | C1002(0.9D) | C1003(0.1D) | |
| | | 8:15:00~8:16:00 | C1003(1D) | | |
| | | 8:16:00~8:33:50 | C1004(0.9D) | C1005(0.1D) | |
| | | 8:33:50~8:34:00 | C1004(0.2D) | C1005(0.8D) | |
| | | 8:34:00~8:35:00 | C1005(1D) | | |

FIG. 28
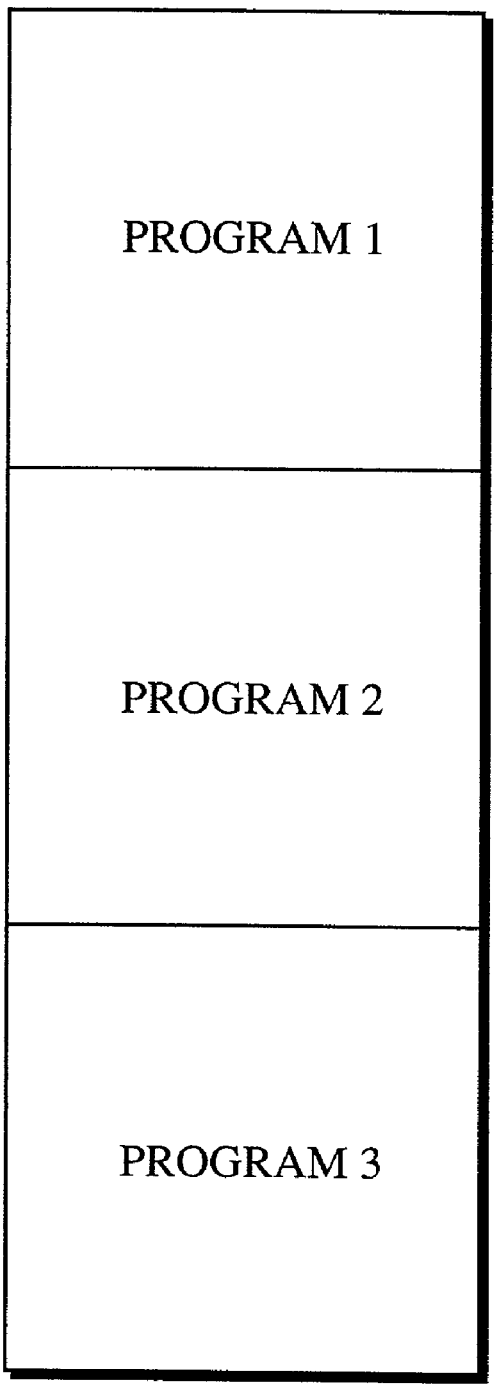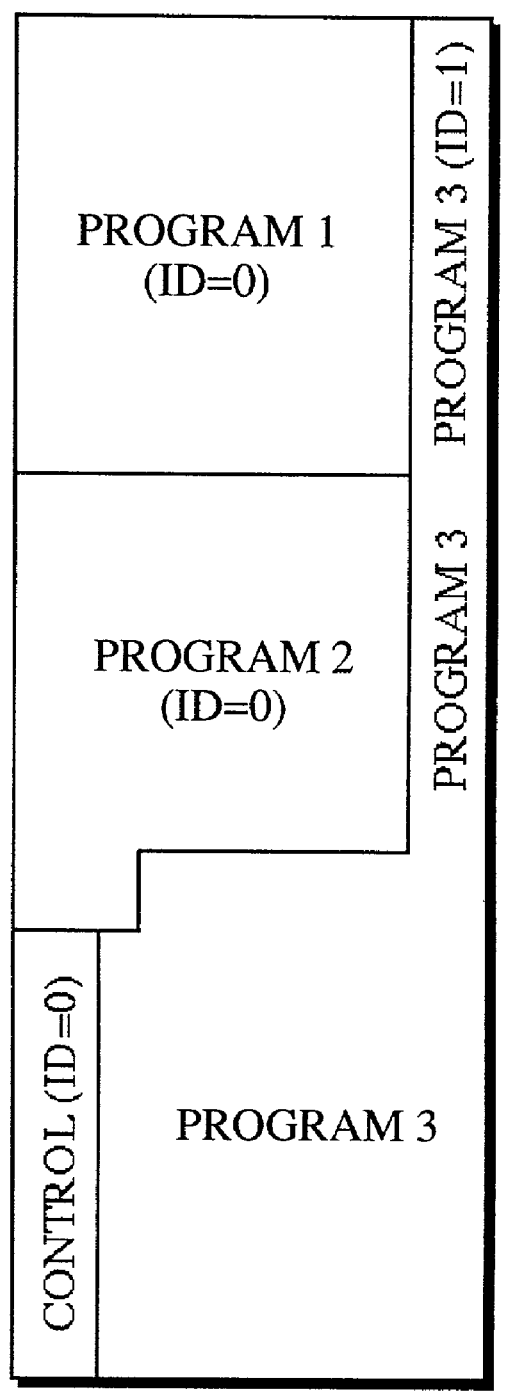

BROADCASTING APPARATUS, BROADCASTING METHOD, PROGRAM RECORDING MEDIUM, AND PROGRAM

BACKGROUND OF THE INVENTION (1) Field of the Invention

The present invention relates to a broadcasting apparatus and a broadcasting method that transmits contents data relating to a program as well as audiovisual data which makes up the program.

(2) Description of the Related Art

Conventionally, methods for transmitting contents data relating to a program as well as audiovisual data which makes up the program have been put to practical use. For instance, a broadcasting apparatus broadcasts a movie while transmitting information on the masterpieces of the actor who appears on the movie is transmitted as contents data, and a receiving apparatus presents the information in accordance with a user's selection. For another instance, a broadcasting apparatus broadcasts a commercial program, while information on the detailed explanations of the product in the commercial is transmitted as contents data and the receiving apparatus presents the explanations.

FIG. 1 shows a transmission schedule for the broadcasting data transmitted by the broadcasting apparatus. As shown in this figure, the broadcasting data consists of audiovisual data and contents data. Here, the contents data is repeatedly transmitted within the reproduction time period. For example, the contents data for CM1 is transmitted three times in the reproduction time period.

By repeatedly transmitting contents data in this way, a user can receive the contents data even when the user starts to watch the program from some midpoint of the program.

However, as shown in FIG. 1, the receiving apparatus has not received contents data at all at the start of the program, because the contents data is transmitted during the broadcasting time period for the program as well as the audiovisual data. Therefore, as shown in this figure, even if there is some image data that should be reproduced at the start of the program CM2, the receiving apparatus cannot present the image data for the period indicated by the diagonally shaded area in the figure (i.e., until the time t2). Furthermore, when a user wishes to select and reproduce an image data during broadcasting of a program and in case that the image data has not been received, the image data cannot be presented until the data has been received.

SUMMARY OF THE INVENTION

In view of the above problems, the object of the present invention is to provide a broadcasting apparatus, a broadcasting method, and a recording medium, and a program by which a time lag between the starting time of broadcasting of the specific program and the starting time of reproduction of the program data of the specific program can be reduced.

In order to achieve the above object, a broadcasting apparatus that broadcasts a specific program to which a reproduction time period between a starting time and a finishing time is specified, the reproduction being performed by a receiving apparatus, the broadcasting apparatus is made up of: allotment means for allotting a broadcasting bandwidth for the reproduction time period to the specific program and allotting a part of the broadcasting bandwidth for a preceding time period immediately before the reproduction time period to the specific program and the other part of the broadcasting bandwidth to other program; and transmission means, in accordance with the result of allotment by the allotment means, for (a) repeatedly transmitting program data of the other program while transmitting program data of the specific program in the preceding time period, and (b) repeatedly transmitting the program data of the specific program in the reproduction time period.

Thereby, the program data of the specific program is transmitted prior to the starting time of reproduction. Therefore a viewer can immediately view the program data from the beginning of broadcasting of the specific program.

Here, in the above broadcasting apparatus (hereafter called "broadcasting apparatus A"), the allotment means sets a starting time of the preceding time period as a first time and a time included in between the first time and the starting time of the reproduction time period as a second time, and the allotment means (a) allots a broadcasting bandwidth not broader than a predetermined broadcasting bandwidth to the specific program from the first time to the second time, and (b) allots a broadcasting bandwidth broader than the predetermined broadcasting to the specific program from the second time to the finishing time of the reproduction time period.

Thereby, a narrow bandwidth is allocated to the specific program prior to a time immediately before the starting time of reproduction of the specific program, and a broad bandwidth is allocated to the specific program after the time, which realizes transmission in consideration of utilization of the program data of other program before the time and realizes transmission for the program data for the specific program only after the time.

Here, in the above broadcasting apparatus A, the transmission means transmits the program data having a second ID of the specific program for the preceding time period, and repeatedly transmits control data as well as the program data for the reproduction time period, and the control data has a first ID and includes instructions for the receiving apparatus, when the receiving apparatus receives the program data having the second ID, to cache and reproduce the program data, wherein a program data having the first ID must be taken in by the receiving apparatus, and the second ID is different from the first ID.

Thereby, an instruction to cache and reproduce the program data of the specific program is embedded in the control data which must be taken in by the receiving apparatus. Therefore, the receiving apparatus can cache and reproduce the program data of the specific program.

Here, in the broadcasting apparatus A, the program data for the specific program is classified into (a) a first type program data and (b) a second type program data which is different from the first type program data at least in part, and the transmission means transmits the first type program data for a duration from the first time to the starting time of the reproduction time period, and transmits the second type program data for a duration from the second time to the finishing time of the reproduction time period.

Thereby, for example, when color graphical data or detailed data is used as the first program data, and monochrome graphical data or simple data is used as the second program data, value-added information can be provided by spending a long time for a viewer who starts to view a program from a time a long time period before the starting time of reproduction of the specific program, and minimum information can be provided in a short time for a viewer who starts to view a program from a time immediately before the starting time of reproduction of the specific program.

Here, the above broadcasting apparatus A further includes: means for transmitting a cache instruction message before the starting time of the reproduction time period of the specific program, wherein the cache instruction message instructs the receiving apparatus to cache the received program data of the specific program.

Thereby, the receiving apparatus executes an operation to cache the program data of the specific program in accordance with the received message, and therefore can receive the program data of the specific program prior to the starting time of reproduction of the specific program.

Here, in the broadcasting apparatus A, the program data of the other programs which is repeatedly transmitted by the transmission means in the preceding time period includes an instruction for the receiving apparatus, when the receiving apparatus receives the program data of the specific program, to cache the program data.

Thereby, the receiving apparatus executes an operation to cache the program data of the specific program in accordance with the received cache instruction which is embedded in the program data of another program, and therefore can receive the program data of the specific program prior to the starting time of reproduction of the specific program.

Here, the above broadcasting apparatus A further includes: means for repeatedly transmitting a cache instruction message at a time interval that is not longer than a transmission period of the program data of the specific program before the starting time of the reproduction time period of the specific program, wherein the cache instruction message instructs the receiving apparatus to cache the received program data of the specific program.

Thereby, a message which designates the receiving apparatus to cache the program data of the specific program at a shorter time interval than the transmission period of the program data of the specific program, which prevents a situation where the receiving apparatus does not cache the program data, while receiving the program data.

Here, the above broadcasting apparatus A further includes: means for transmitting a reproduction instruction message at the starting time of the reproduction time period of the specific program, wherein the reproduction instruction message instructs the receiving apparatus to reproduce the recorded program data of the specific program immediately after receiving the message.

Thereby, in case that the receiving apparatus acquires the program data of the specific program in advance, the receiving apparatus can reproduce the program data of the specific program at the starting time of reproduction of the specific program, which eliminates the necessity for a viewer to wait for the presentation of the program data of the specific program.

Here, the above broadcasting apparatus further includes: means for transmitting a deletion instruction message at the finishing time of the reproduction time period of the specific program, wherein the deletion instruction message instructs the receiving apparatus to delete the recorded program data of the specific program immediately after receiving the message.

Thereby, the program data of the specific program is deleted from the storing unit in the receiving apparatus at the finishing time of reproduction of the specific program, which prevents a situation where unnecessary data is kept in the storing unit.

Here, the above broadcasting apparatus A further includes: table data transmission means for transmitting table data before the starting time of the reproduction time period of the specific program, wherein the table data includes information on correspondences between instructions to cache, reproduce, and delete the program data of the specific program and instruction IDs that are assigned for the instructions; first message transmission means for transmitting a first message before the starting time of the reproduction time period of the specific program, wherein the first message consists of an instruction ID that identifies the cache instruction and a program ID that identifies the program data of the specific program; second message transmission means for transmitting a second message at the starting time of the reproduction time period of the specific program, wherein the second message consists of an instruction ID that identifies the reproduction instruction and a program ID that identifies the program data of the specific program; and third message transmission means for transmitting a third message at the finishing time of the reproduction time period of the specific program, wherein the third message consists of an instruction ID that identifies the deletion instruction and a program ID that identifies the program data of the specific program.

Thereby, the receiving apparatus can acquire the program data of the specific program prior to the starting time of reproduction of the specific program, reproduce the program data at the starting time of reproduction of the specific program, and delete the program data from the storing unit at the finishing time of reproduction of the specific program.

Here, in the above broadcasting apparatus A, the time period between the second time and the starting time of the reproduction time period and the allocated broadcasting bandwidth for transmitting the program data of the specific program from the second time to the starting time of the reproduction time period are necessary for transmitting data whose data size is larger than the data size of the program data of the specific program.

Thereby, the program data of the specific program is transmitted once or more times before the immediately preceding transmission period between the second time and the starting time of reproduction. Therefore, a viewer who starts to view a program from a time immediately before the starting time of reproduction of the specific program can acquire the program data of the specific program in a short time period.

Here, in the above broadcasting apparatus A, the allotment means allots a narrower bandwidth for transmitting the program data for the specific program from the second time to the starting time of the reproduction time period of the specific program than a bandwidth for transmitting the program data from the starting time to the finishing time of the reproduction time period.

Thereby, the broadcasting bandwidth allocated to the specific program in the immediately preceding transmission period between the second time and the starting time of reproduction is narrower than the broadcasting bandwidth allocated to the specific program in the reproduction time period. Therefore, a broadcasting bandwidth can be allocated to the preceding other programs as well in the immediately preceding transmission period.

In addition, a broadcasting apparatus (hereafter called "broadcasting apparatus B") that transmits a data broadcasting program and a first and a second specific programs which are interposed in the data broadcasting program, the broadcasting apparatus is made up of: allotment means for (a) allotting a broadcasting bandwidth for a first time period and a second time period to the first specific program and the second specific program, the first time period and the second time period are included in a total time period between a starting time and a finishing time for broadcasting the data broadcasting program, and (b) allotting a part of the broadcasting bandwidth to the first and the second specific programs and the other part of the broadcasting bandwidth to the data broadcasting program for all of time periods other than the first and the second time periods in the total time period; instruction generation means for generating a first storage instruction and a second storage instruction that instruct the receiving apparatus to store a program data for the first specific program and a program data for the second specific program in a storing unit in the receiving apparatus, respectively, and generating a first reproduction instruction and a second reproduction instruction that instruct a receiving apparatus to reproduce the program data for the first specific program and the program data for the second specific program, respectively, in case that the program data for the first specific program and the program data for the second specific program have been stored in the storing unit; transmission means for repeatedly transmitting the program data of each of the data broadcasting program, the fist specific program, and the second specific program in accordance with the result of allotment by the allotment means; and control means for controlling the transmission means so as to transmit (a) a plurality of the first storage instructions before the first time period, (b) the first reproduction instruction at the starting time of the first time period, (c) a plurality of the second storage instructions before the second time period, and (d) the second reproduction instruction at the starting time of the second time period.

Thereby, the receiving apparatus receives the program data of the first specific program and the second specific program in a time period other than the reproduction time period of the first specific program and the second specific program. Therefore, a viewer can view the program data of these programs immediately from the beginning of broadcasting of the first specific program and the second specific program.

Here, in the above broadcasting apparatus B, the allotment means allots (a) a broadcasting bandwidth not narrower than a predetermined broadcasting bandwidth to the program data of the first specific program for the first time period, (b) a broadcasting bandwidth not broader than the predetermined broadcasting bandwidth to the program data of the second specific program for the second time period, (c) a broadcasting bandwidth narrower than the predetermined broadcasting bandwidth to the program data of the first specific program for a time period other than the first time period in the total time period, and (d) a broadcasting bandwidth narrower than the predetermined broadcasting bandwidth to the program data of the second specific program for a time period other than the second time period in the total time period.

Thereby, broad bandwidths are allocated to the first specific program and the second specific program in the reproduction time periods of the first specific program and the second specific program, and narrow bandwidths are allocated to these programs in a time period other than the reproduction time periods, which realizes transmission in consideration of utilization of the program data of the other programs in a time period other than the reproduction time periods and realizes transmission for the program data for the first and the second specific programs only in their reproduction time period.

Here, in the above broadcasting apparatus B, the allotment means allots (a) a broadcasting bandwidth not narrower than a predetermined broadcasting bandwidth to the program data of the first specific program for the first time period and a time period immediately before the first time period, (b) a broadcasting bandwidth not narrower than the predetermined broadcasting bandwidth to the program data of the second specific program for the second time period and a time period immediately before the second time period, (c) a broadcasting bandwidth narrower than the predetermined broadcasting bandwidth to the program data of the first specific program for a time period other than the first time period and the time period immediately before the first time period in the total time period, and (d) a broadcasting bandwidth narrower than the predetermined broadcasting bandwidth to the program data of the second specific program for a time period other than the second time period and the time period immediately before the second time period in the total time period.

Thereby, broad bandwidths are allocated to the first specific program and the second specific program in a time period between a time immediately before the starting time of reproduction and the finishing time of reproduction, and narrow bandwidths are allocated to these programs in a time period other than the above time period, which realizes transmission in consideration of utilization of the program data of the other programs in the latter time period and realizes transmission for the program data for the first and the second specific programs only in the former time period.

In addition, a broadcasting apparatus (hereafter called "broadcasting apparatus C") that transmits a data broadcasting program and a first and a second specific programs which are interposed in the data broadcasting program, the broadcasting apparatus is made up of: allotment means for (a) allotting a broadcasting bandwidth for a first time period and a second time period to the first specific program and the second specific program, the first time period and the second time period are included in a total time period between a starting time and a finishing time for broadcasting the data broadcasting program, and (b) allotting (1) a broadcasting bandwidth to the data broadcasting data program in the total time period except for the first time period and the second time period, (2) a part of the broadcasting bandwidth to the first specific program for a time period preceding to the first time period in the total time period, and (3) a part of the broadcasting bandwidth to the second specific program for a time period preceding to the second time period in the total time period; instruction generation means for generating a first storage instruction and a second storage instruction that instruct a receiving apparatus to store a program data for the first specific program and a program data for the second specific program in a storing unit in the receiving apparatus, respectively, and generating a first reproduction instruction and a second reproduction instruction that instruct the receiving apparatus to reproduce the program data for the first specific program and the program data for the second specific program, respectively, in case that the program data for the first specific program and the program data for the second specific program have been stored in the storing unit; transmission means for repeatedly transmitting the program data of each of the data broadcasting program, the fist specific program, and the second specific program in accordance with the result of allotment by the allotment means; and control means for controlling the transmission means so as to transmit (a) a plurality of the first storage instructions before the first time period, (b) a plurality of the second storage instructions before the second time period, (c) the first reproduction instruction at the starting time of the first time period, and (d) the second reproduction instruction at the starting time of the second time period.

Thereby, the receiving apparatus receives the program data of the first specific program and the second specific program prior to the starting time of reproduction of the first specific program and the second specific program. Therefore, a viewer can view the program data of these programs immediately from the beginning of broadcasting of these programs.

Here, in the above broadcasting apparatus C, the allotment means allots (a) a broadcasting bandwidth not narrower than a predetermined broadcasting bandwidth to the program data of the first specific program for the first time period, (b) a broadcasting bandwidth not narrower than the predetermined broadcasting bandwidth to the program data of the second specific program for the second time period, (c) a broadcasting bandwidth narrower than the predetermined broadcasting bandwidth to the program data of the first specific program for a time period preceding to the first time period in the total time period, and (d) a broadcasting bandwidth narrower than the predetermined broadcasting bandwidth to the program data of the second specific program for a time period preceding to the second time period in the total time period.

Thereby, narrow bandwidths are allocated to the first specific program and the second specific program before the starting time of reproduction of the first and the second specific programs, and broad bandwidths are allocated to these programs after the starting time of reproduction of these programs, which realizes transmission in consideration of utilization of the program data of the other programs before the starting time of reproduction of these programs and realizes transmission for the program data for these programs only after the starting time of reproduction of these programs.

Here, in above the broadcasting apparatus C, the allotment means allots (a) a broadcasting bandwidth not narrower than a predetermined broadcasting bandwidth to the program data of the first specific program for the first time period and a time period immediately before the first time period, (b) a broadcasting bandwidth not narrower than the predetermined broadcasting bandwidth to the program data of the second specific program for the second time period and a time period immediately before the second time period, (c) a broadcasting bandwidth narrower than the predetermined broadcasting bandwidth to the program data of the first specific program for a time period preceding to the first time period and the immediately preceding period to the first time period in the total time period, and (d) a broadcasting bandwidth narrower than the predetermined broadcasting bandwidth to the program data of the second specific program for a time period preceding to the second time period and the immediately preceding period to the second time period in the total time.

Thereby, narrow bandwidths are allocated to the first specific program and the second specific program before a time immediately before the starting time of reproduction of the first and the second specific programs, and broad bandwidths are allocated to these programs after the time, which realizes transmission in consideration of utilization of the program data of the other programs before the time and realizes transmission for the program data for these programs only after the time.

In addition, a broadcasting apparatus (hereafter called "broadcasting apparatus D") that transmits a program block which is composed of a data broadcasting program and a program or two or more successive programs which are interposed in the data broadcasting program, wherein a reproduction time period between a starting time and a finishing time is specified to each of the data broadcasting program and programs included in the program block and the reproduction is performed by a receiving apparatus, the broadcasting apparatus is made up of: allotment means for (a) allotting a broadcasting bandwidth from a first time to the starting time of the reproduction time period of the leading program included in the specific program block to the data broadcasting program and all of the programs included in the specific program block, and (b) allotting the broadcasting bandwidth for a reproduction time period of each program included in the specific program block to the program and the following programs included in the same program block, wherein the first time is a time in the reproduction time period of the data broadcasting program and which satisfies a condition so as not to interpose the other program blocks between the first time and the specific program block; instruction generation means for generating a storage instruction that instructs the receiving apparatus to store a program data of each program included in the specific program block in a storing unit in the receiving apparatus, and generating a reproduction instruction that instructs the receiving apparatus to reproduce the program data, in case that the program data of each program has been stored in the storing unit; transmission means for repeatedly transmitting the program data of the data broadcasting program and each program included in the specific program block in accordance with the result of allotment by the allotment means; and control means for controlling the transmission means so as to transmit a plurality of the storage instructions for each program included in the specific program block before the starting time of the reproduction time period of the program, and transmit the reproduction instruction for the program at the starting time of the reproduction time period of the program.

Thereby, the receiving apparatus receives the program data of each program included in the specific program block prior to the starting time of reproduction of the program. Therefore, a viewer can view the program data of each program included in the specific program block immediately from the beginning of broadcasting of the program.

Here, in the above broadcasting apparatus D, in case that a first program and a second program which follows the first program are included in the program block, the allotment means determines a broadcasting bandwidth which is allocated to each of the first program and the second program for a first through a third transmission time periods in the following manner: here the first through the third transmission time periods are time periods which are divided by the first time, a second time, the finishing time of the reproduction time period of the first program, and the finishing time of the reproduction time period of the second program in the stated order, and the second time is a time for the reproduction time period of the data broadcasting program, the allotment means allots (a) a broadcasting bandwidth not broader than a predetermined broadcasting bandwidth to the first and the second programs for the first transmission time period, (b) a broadcasting bandwidth broader than the predetermined broadcasting bandwidth to the first program and a broadcasting bandwidth not broader than the predetermined broadcasting bandwidth to the second program for the second transmission period, and (c) a broadcasting bandwidth broader than the predetermined broadcasting bandwidth to the second program for the third transmission time period.

Thereby, the broadcasting bandwidth allocated to the second program remains the predetermined broadcasting bandwidth or narrower until the starting time of reproduction of the second program. Therefore, the program data of the first program can be transmitted by priority in the reproduction time period of the first program.

Here, in the above broadcasting apparatus D, in case that a first program and a second program which follows the first program are included in the program block, the allotment means determines a broadcasting bandwidth which is allocated to the first program and the second program for a first through a fourth transmission time periods in the following manner: here the first through the fourth transmission time periods are time periods which are divided by the first time, a second time, a third time, the starting time of the reproduction time period of the second program, and the finishing time of the reproduction time period of the second program in the stated order, and the second time is a time in the reproduction time period of the data broadcasting program, and the third time is a time in the reproduction time period of the first program, the allotment means allots (a) a broadcasting bandwidth not broader than a predetermined broadcasting bandwidth to the first and the second programs for the first transmission time period, (b) a broadcasting bandwidth broader than the predetermined broadcasting bandwidth to the first program and a broadcasting bandwidth not broader than the predetermined broadcasting bandwidth to the second program for the second transmission period, (c) a broadcasting bandwidth broader than the predetermined broadcasting bandwidth to the first program and a broadcasting bandwidth broader than the predetermined broadcasting bandwidth to the second program for the third transmission time period, and (d) a broadcasting bandwidth broader than the predetermined broadcasting bandwidth to the second program for the fourth transmission time period.

Thereby, the broadcasting bandwidth allocated to the second program becomes the predetermined broadcasting or broader from a time immediately before the finishing time of reproduction of the first program. Therefore, the program data for the second program as well as the program data for the first program can be transmitted in consideration of utilization of the program data of the second program from the time immediately before the finishing time of reproduction of the first program.

As stated above, according to the invention, the program data can be transmitted as well as the audiovisual data without delay, which improves the quality of broadcasting service using the program data. Therefore, the practical effects of the invention are considerably great.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings:

FIG. 3 shows an example of program information;

FIG. 4 shows an example of an audiovisual data transmission schedule;

FIG. 5 shows an example of a contents transmission schedule;

FIG. 7 shows a relationship between contents management codes and data modules;

FIG. 8 shows an example of an event message transmission schedule;

FIG. 9 shows a procedure for transmitting a data module;

FIG. 16 shows an example of a contents transmission schedule;

FIG. 18 shows an example of a contents transmission schedule;

FIG. 20 shows an example of a contents transmission schedule;

FIG. 22 shows an example of a contents transmission schedule;

FIG. 24 shows an example of a contents transmission schedule;

FIG. 26 shows an example of a contents transmission schedule;

FIG. 28 shows an example in which the program 3 is a cache target program;

DESCRIPTION OF THE PREFERRED EMBODIMENT

The following describes preferred embodiments of the present invention with reference to drawings.

Embodiment 1

(Construction)

Figure 1:
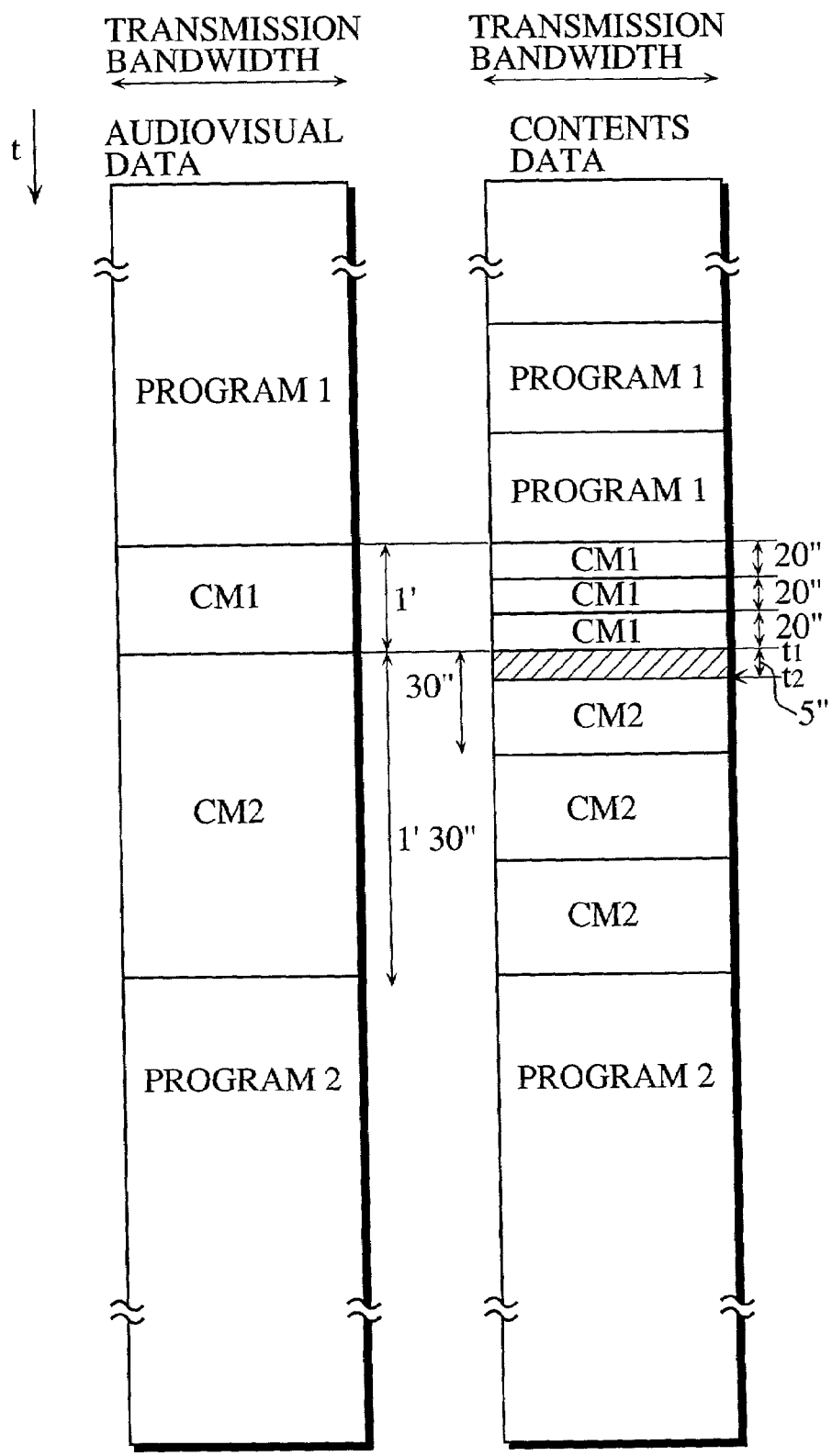
FIG. 1 is a transmission schedule for the broadcasting data transmitted by the broadcasting apparatus.
Figure 2:
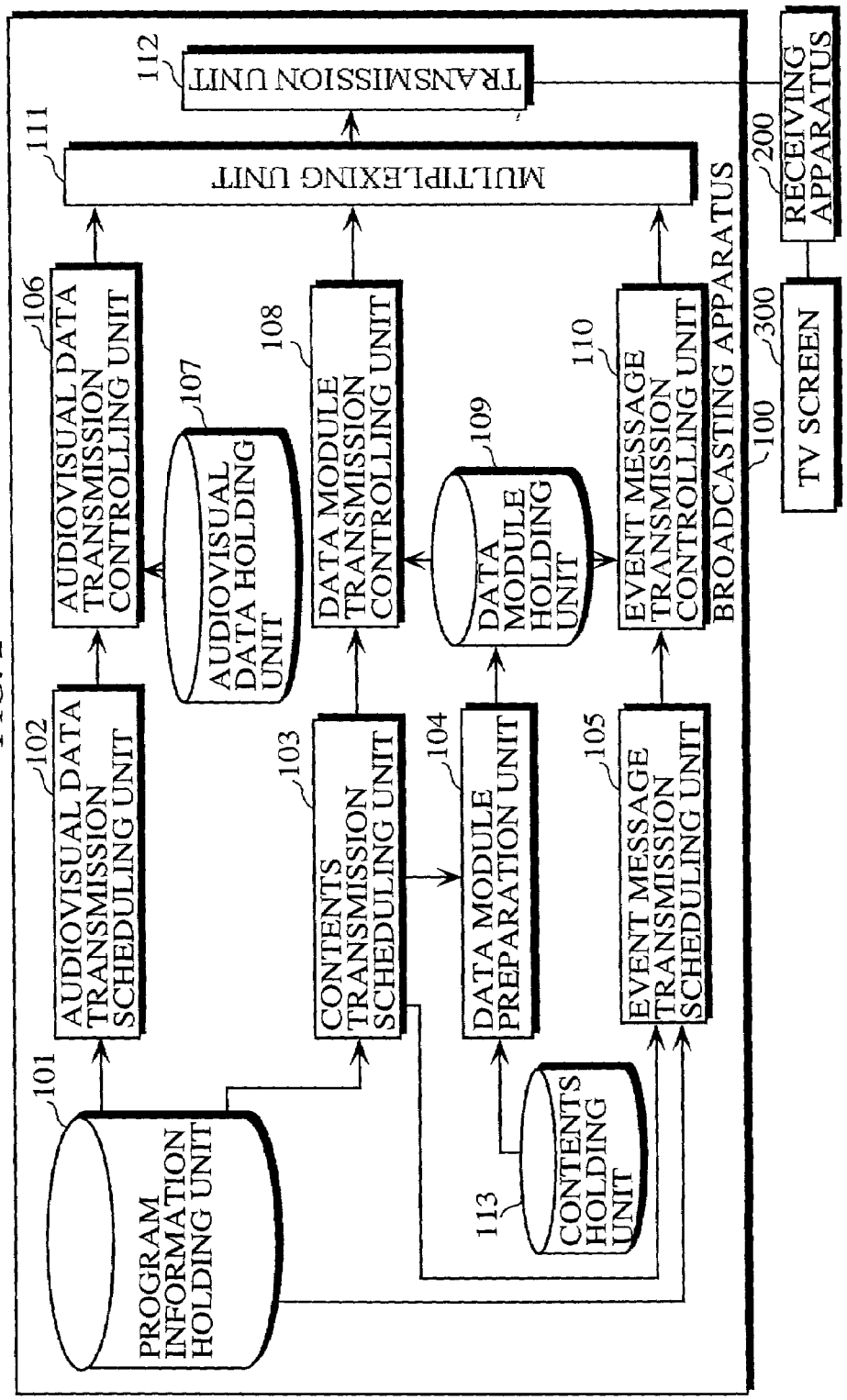
FIG. 2 is a block diagram showing the construction of the broadcasting apparatus according to the preferred embodiment of the invention.

FIG. 2 is a block diagram showing the construction of the broadcasting apparatus according to the first embodiment. A broadcasting apparatus 100 transmits contents data for the specific program among broadcasting programs prior to the starting time of reproduction of the program, and is composed of a program information holding unit 101, an audiovisual data transmission scheduling unit 102, a contents transmission scheduling unit 103, a data module preparation unit 104, an event message transmission scheduling unit 105, an audiovisual data transmission controlling unit 106, an audiovisual data holding unit 107, a data module transmission controlling unit 108, a contents holding unit 113, a data module holding unit 109, an event message transmission controlling unit 110, a multiplexing unit 111, and a transmission unit 112.

The program information holding unit 101 stores program information. FIG. 3 shows an example of the program information. The program information includes a broadcasting date, a channel code, a program management code, a program title, a starting time of the program, an ending time of the program, an audiovisual data management code which indicates the audiovisual data which makes up the program content, and a contents management code which indicates the contents data, all of which are specified for each program.

The audiovisual data transmission scheduling unit 102 prepares the schedule for transmitting the audiovisual data in accordance with the program information stored in the program information holding unit 101 and outputs the schedule to the audiovisual data transmission controlling unit 106. FIG. 4 shows an example of an audiovisual data transmission schedule. As shown in this figure, the audiovisual data is transmitted in the reproduction time for the program. On receiving the transmitted audiovisual data, the receiving apparatus reproduces the audiovisual data in real time.

The contents transmission scheduling unit 103 is the most distinctive element in this embodiment, and prepares a schedule so that contents data for the specific programs among various programs are transmitted prior to the starting time of the reproduction of such programs. Hereafter, such specific programs will be referred to as "cache target programs." In this embodiment, the cache target programs are commercial programs CM1, CM2, and CM3.

The contents transmission scheduling unit 103 prepares a transmission schedule so that contents data on the cache target programs CM1, CM2, and CM3 are transmitted prior to their respective reproduction starting time. In this embodiment, for one example, these contents data are transmitted from the first time when the data broadcasting program sponsored by CM1, CM2, and CM3 starts to be broadcasted.

In addition, the contents transmission scheduling unit 103 determines a transmission bandwidth for contents data. That is, the contents transmission scheduling unit 103 prepares a schedule so that contents data for the cache target programs is transmitted from a first time to a second time (immediately before the starting time of reproduction) by using a narrow bandwidth (i.e., a predetermined bandwidth or narrower), and from the second time to the finishing time of reproduction, the bandwidth for transmitting the contents data becomes widen (i.e., the predetermined bandwidth or more). Hereafter, the time period between the first time and the second time will be called "the first preceding transmission period," the time period between the second time and the reproduction starting time will be called "the second preceding transmission period," and the time period between the reproduction starting time and the reproduction finishing of the program will be called "a reproduction period."

In this embodiment, for example, a transmission bandwidth is determined in accordance with the following criteria. Here, D indicates the bandwidth which is allocated for transmitting all contents data.

(Criterion A1)
The bandwidth for transmitting contents data for cache target programs in the first preceding transmission period is set at 0.1D.

That is, the contents data for the cache target programs are gradually transmitted by using a narrow bandwidth and spending a long time, because with decreasing the bandwidth for transmitting the contents data for the program which is now being broadcasted, it takes a longer time to acquire contents data of the program.

(Criterion A2)
The bandwidth for transmitting contents data for control is set at 0.05D.

Here, the contents data for control consists of messages only which designate processes such as caching and reproducing of contents data for cache target programs and therefore the data size is small. Thus, the contents data for control can be transmitted for a short period even in such a narrow bandwidth.

(Criterion A3)
The bandwidth for transmitting contents data for the program in the reproduction period is obtained by subtracting the transmission bandwidth for contents data for control 0.05D, the transmission bandwidth for the program in the first preceding transmission period, and the transmission bandwidth for the program in the second preceding transmission period, if any, from the transmission bandwidth D for all contents data.

(Criterion A4)
The bandwidth for transmitting contents data for the cache target program in the second preceding transmission period is obtained by narrowing the transmission bandwidth for the program in the following reproduction period by 0.2D.

FIG. 5 shows an example of a contents transmission schedule. As shown in this figure, the time period between 8:00:00 and 8:13:50 is for the reproduction time of the program 1 and the first preceding transmission period of CM1, CM2, and CM3. In this period, the contents data for the program1 (C1001) as well as the contents data for CM1, CM2, and CM3 (C1002, C1003, and C1005) are transmitted. The bandwidths for transmitting C1002, C1003, and C1005 are each set at 0.1D (according to Criterion A1) and the bandwidth for transmitting C1001 is set at 0.7D (=D−0.1D× 3) (according to Criterion A3).

The time period between 8:13:50 and 8:14:00 is for the reproduction time of the program 1, the second preceding transmission period of CM1, and the first preceding transmission period of CM2 and CM3. Since the bandwidth for transmitting C1002 for CM1 in this period is narrower than the #bandwidth for transmitting C1002 in the reproduction period of the CM1 by 0.2D (according to Criterion A4), the former bandwidth is determined after the latter bandwidth is determined. The bandwidths for transmitting C1003 for CM2 and C1005 for CM3 remain 0.1D (according to Criterion A1) and the bandwidth for transmitting C1001 for the program 1 is determined after the bandwidth for transmitting the above C1002 is determined.

The time period between 8:14:00 and 8:14:50 is for the reproduction period of CM1 and for the first preceding transmission period of CM2 and CM3. The bandwidth for transmitting contents data for control S1001 is set at 0.05D (according to A2) and the bandwidths for transmitting C1003 for CM2 and C1005 for CM 3 are each set at 0.1D (according to Criterion A1). The bandwidth for transmitting C1002 for CM1 is set at 0.75D (=D−0.05D−0.1D×2) (according to Criterion A3). As a result, the bandwidth for transmitting C1002 in the second preceding transmission period of CM1 (8:13:50 to 8:14:00) becomes 0.55D which is narrower than the bandwidth in the reproduction period of the CM1 by 0.2D (according to Criterion A4) and therefore the bandwidth for transmitting C1001 in the reproduction period becomes 0.25D (=D−0.55D−0.1D×2) (according to Criterion A3).

The time period between 8:14:50 and 8:15:00 is for the reproduction period of CM1, the second preceding transmission period of CM2, and the first preceding transmission period of CM3. The bandwidth for transmitting contents data for control S1001 is set at 0.05D (according to Criterion A2), the bandwidth for transmitting C1005 for CM3 is set at 0.1D (according to Criterion A1), and the bandwidths for transmitting C1002 for CM1 and C1003 for CM2 are determined after the bandwidths for these data in the following period are determined.

The time period between 8:15:00 and 8:16:00 is for the reproduction period of CM2 and the first preceding transmission period of CM3. In this period, the bandwidth for transmitting contents data for control S1002 is set at 0.05D (according to Criterion A2) and the bandwidth for transmitting C1005 for CM3 is set at 0.1D (according to Criterion A1). The bandwidth for transmitting C1003 for CM2 is set at 0.85D (=D−0.05D−0.1D) (according to Criterion A3). Therefore, the bandwidth for transmitting C1003 in the second preceding transmission period of CM2 (8:14:50 to 8:15:00) becomes 0.65D which is narrower than the bandwidth in the reproduction period of CM2 by 0.2D (according to Criterion A4) and the bandwidth for transmitting C1002 for CM1 becomes 0.2D (=D−0.05D−0.65D−0.1D) (according to Criterion A3).

Next, the time period between 8:16:00 and 8:33:50 is for the reproduction period of the program 2 and the first preceding transmission period of CM3. The bandwidth for transmitting C1005 for CM3 is set at 0.1D (according to Criterion A1) and the bandwidth for transmitting C1004 for the program 2 is set at 0.9D (=D−0.1D) (according to Criterion A3).

The time period between 8:33:50 and 8:34:00 is for the reproduction period of the program 2 and the second preceding transmission period for CM3. The bandwidths for transmitting C1005 for CM3 and C1004 for the program 2 are determined after the bandwidths for these data in the following time period are determined.

The time period between 8:34:00 and 8:35:00 is for the reproduction period of CM3. The bandwidth for transmitting contents data for control S1003 is set at 0.05D (according to Criterion A2) and the bandwidth for transmitting contents data C1005 for CM3 is set at 0.95D (=D−0.05D) (according to Criterion A3). Therefore, the bandwidth for transmitting C1005 in the second preceding transmission period of CM3 (8:33:50 to 8:34:00) becomes 0.75D which is narrower than the bandwidth for this data in this reproduction period of CM3 by 0.2D (according to Criterion A4), and the bandwidth for transmitting C1004 for the program 2 becomes 0.25D (=D−0.75D) (according to Criterion A3).

The contents holding unit 113 stores contents data, while bringing these data into correspondence with their respective contents codes. Here, the contents data includes graphical images which present information relating to the program, scripts which are executed in accordance with the interactive operation by the user, and the like.

The data module preparation unit 104 refers to the schedule which is prepared by the contents transmission scheduling unit 103, prepares a data module which is made up of contents data stored in the contents holding unit 113, and writes the data module in the data module holding unit 109, while bringing the data module into correspondence with the contents codes. The data module is the contents data which is represented in a form for transmission. Although one data module is made from one contents data for simplifying the explanation in this embodiment, two or more data modules may be made from one contents data. ID is assigned to the data module, and the data module with the ID=0 must be transmitted and must be received by the receiving apparatus. In addition, the data module preparation unit 104 adds a message which designates processes such as caching and reproduction of the data modules having IDs other than 0 in the contents data as the source of the data module with ID=0, before preparing the data module with ID=0. Here, one data module is divided into a block in a unit of a fixed length, and transmitted in this block unit.

Figure 6:
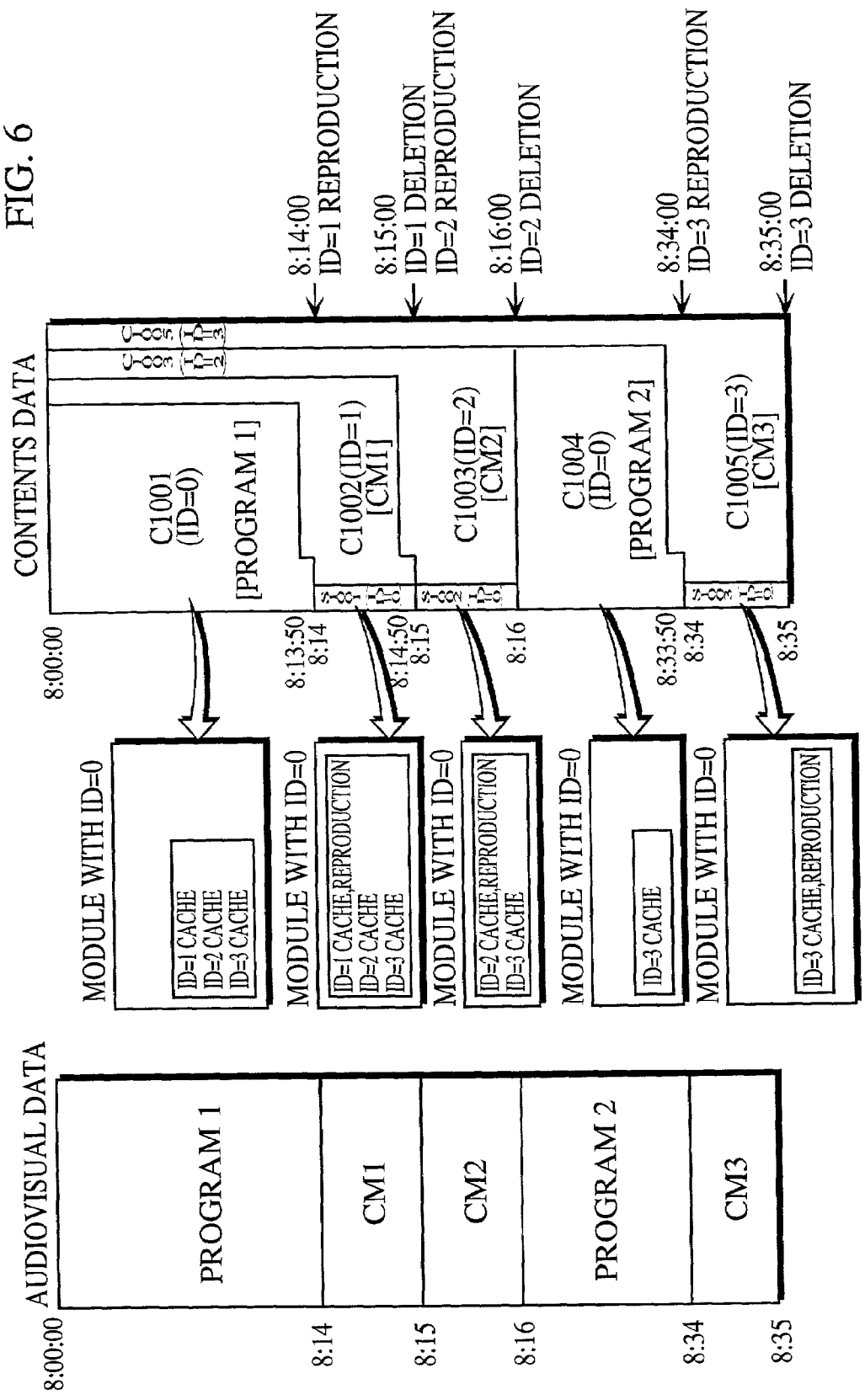
FIG. 6 shows a relationship between contents data and IDs assigned to data modules, and an example of a message embedded in the data module with ID=0.

The following describes a method for assigning IDs to data modules and a message which is described in the contents data as a source of the data module with ID=0. FIG. 6 shows a relationship between contents data and IDs of data modules, and an example message which is embedded in the contents data as the source of the data module with ID=0.

First, the data module preparation unit 104 prepares data modules with ID=0, ID=1, ID=2, and ID=3 using contents data C1001, C1002, C1003, and C1005 in accordance with the contents transmission schedule shown in FIG. 5. Here, the data module preparation unit 104 embeds messages which designate to cache data modules (C1002, C1003, and C1005) with ID=1, ID=2, and ID=3 which are transmitted concurrently with the contents data (C1001) in the contents data (C1001) as the source of the data module with ID=0, and prepares a data module with ID=0 using the contents data C1001.

Further, the data module preparation unit 104 prepares a data module with ID=0 which corresponds to contents data for control S1001. That is, the data module preparation unit 104 embeds a message, which designates to cache and reproduce a data module (C1002) with ID=1 and to cache data modules (C1003 and C1005) with ID=2 and ID=3, in the contents data S1001 and then prepares a data module with ID=0 using the contents data S1001.

Also, the data module preparation unit 104 prepares a data module with ID=0 which corresponds to contents data for control S1002. That is, the data module preparation unit 104 embeds a message, which designates to cache and reproduce a data module (C1003) with ID=2 and to cache a data module (C1005) with ID=3, in the contents data S1002, and then prepares a data module with ID=0 using the contents data S1002.

Besides, the data module preparation unit 104 prepares a data module with ID=0 which corresponds to contents data C1004. That is, the data module preparation unit 104 embeds a message, which designates to cache a data module (C1005) with ID=3 in the contents data C1004, and then prepares a data module with ID=0 using the contents data C1004.

Moreover, the data module preparation unit 104 prepares a data module with ID=0 which corresponds to contents data for control S1003. That is, the data module preparation unit 104 embeds a message, which designates to cache and reproduce a data module (C1005) with ID=3, in the contents data S1003, and prepares a data module with ID=0 using the contents data S1003.

The data module holding unit 109 stores the data modules prepared by the data module preparation unit 104, while bringing the data modules into correspondence with contents management codes. FIG. 7 shows a mapping between the contents management codes and the data modules.

The event message transmission scheduling unit 105 refers to the contents transmission schedule prepared by the contents transmission scheduling unit 103 and prepares an event message transmission schedule. There are three types of event messages which each designate to delete, reproduce, and cache the specified contents data. When the receiving apparatus receives the event message which designates to delete the contents data, the receiving apparatus deletes the contents data from the recording apparatus. When the receiving apparatus receives the event message which designates to reproduce the contents data, the receiving apparatus reads the contents data from the recording apparatus and reproduce the same. When the receiving apparatus receives the instruction to record the contents data and in case that the contents data has not been recorded, then the receiving apparatus writes the received contents data in the recording apparatus.

The event message transmission scheduling unit 105 refers to the contents transmission schedule and the program information, and prepares a schedule for transmitting an event message which designates to delete contents data from the recording apparatus or to reproduce contents data in the recording apparatus in accordance with the following criteria.

(Criterion B1)

The schedule is prepared so that an event message which designates to delete the contents data for a program is transmitted at the finishing time of the program. Here, the data module with ID=0 which corresponds to the contents data is exception to this Criterion, because the data module with ID=0 is always taken in and overwritten.

(Criterion B2)

The schedule is prepared so that an event message which designates to reproduce the contents data for a cache target program is transmitted at the starting time of the program.

(Criterion B3)

FIG. 8 shows an example of an event message transmission schedule. As shown in this figure, for example, as for contents data C1002 for the cache target program CM1, the schedule is prepared so that an event message which designates to reproduce the contents data is transmitted at 8:14:00 when the program which is made up of the contents data is scheduled to start (according to Criterion B2), and so that an event message which designates to delete the contents data is transmitted at 8:15:00 when the program is scheduled to finish (according to Criterion B1).

As for contents data C1003 for the cache target program CM2, the schedule is prepared so that an event message which designates to reproduce the contents data is transmitted at 8:15:00 when the program is scheduled to start (according to Criterion B2), and so that an event message which designates to delete the contents data is transmitted at 8:16:00 when the program is scheduled to finish (according to Criterion B1).

As for contents data C1005 for the cache target program CM3, the schedule is prepared so that an event message which designates to reproduce the contents data is transmitted at 8:34:00 when the program which is made up of the contents data is scheduled to start (according to Criterion B2), and the schedule is prepared so that an event message which designates to delete the contents data is transmitted at 8:35:00 when the program is scheduled to finish (according to Criterion B1).

In accordance with the audiovisual data transmission schedule transmitted by the audiovisual data transmission scheduling unit 102, the audiovisual data transmission controlling unit 106 reads the audiovisual data which corresponds to the audiovisual data management codes included in the schedule from the audiovisual data holding unit 107, and outputs the audiovisual data to the multiplexing unit 111.

The audiovisual data holding unit 107 stores audiovisual data which corresponds to the audiovisual data management codes.

In accordance with the contents transmission schedule transmitted by the contents transmission scheduling unit 103, the data module transmission controlling unit 108 repeatedly reads the data module which corresponds to the contents codes included in the schedule from the data module holding unit 109, and outputs the data module to the multiplexing unit 111.

FIG. 9 shows a transmission procedure of the data module during the time period between 8:00:00 and 8:14:00.Data module with ID=0 for C1001, data module with ID=1 for C1002, data module with ID=2 for C1003, and data module with ID=3 for C1005 respectively consist of thirty, four, five, and five blocks. In this figure, the notation "1-3" means that a block whose block number is 3 and which makes up the data module with ID=1 is transmitted.

As shown in this figure, when the data module (C1001) with ID=0 is transmitted, this data module is transmitted 7 times out of 10, because the transmission bandwidth is 0.7D. Data module (C1002) with ID=1, data module (C1003) with ID=2, data module (C1005) with ID=3 are each transmitted once out of 10, because each of their transmission bandwidth is 0.1D.

At the stage of (1) in this figure where is at the second preceding transmission period of CM1, the data module (C1001) with ID=0 is transmitted 5 times out of 20, because the transmission bandwidth for the data module becomes 0.25D. The data module (C1002) with ID=1 is transmitted 11 times out of 20, because the transmission bandwidth becomes 0.55D. The data module (C1003) with ID=2 and the data module (C1005) with ID=3 are each transmitted once out of 10 (i.e., twice out of 20), because each of their transmission bandwidth is 0.1D.

The event message transmission controlling unit 110 outputs event messages to the multiplexing unit 111 in accordance with the event message transmission schedule transmitted by the event message transmission scheduling unit 105. FIG. 6 shows the transmitted event messages in accordance with the event message transmission schedule shown in FIG. 8.

As shown in FIG. 6, at 8:14:00 an event message which designates to reproduce contents data C1002 (data module with ID=1) is transmitted. At 8:15:00, an event message which designates to delete the contents data C1002 (data module with ID=1), and an event message which designates to reproduce contents data C1003 (data module with ID=2) are transmitted in this order. At 8:16:00, an event message which designates to delete the contents data C1003 (data module with ID=2) is transmitted. At 8:34:00, an event message which designates to reproduce contents data C1005 (data module with ID=3) is transmitted. At 8:35:00, an event message which designates to delete contents data S1003 (data module with ID=0 ) and an event message which designates to delete the contents data C1005 (data module with ID=3) are transmitted in this order.

The multiplexing unit 111 performs time division multiplexing of the audiovisual data transmitted by the audiovisual data transmission controlling unit 106 and the event messages transmitted by the event message transmission controlling unit 110 to generate a multiplexed stream, and outputs the multiplexed stream to the transmission unit 112. Here, the event messages are multiplexed so as to be promptly transmitted. Besides, the data modules and the event messages are multiplexed so as to occupy a fixed bandwidth which is allocated to the contents data and the audiovisual data is multiplexed so as to occupy a fixed bandwidth which is allocated to the audiovisual data.

The transmission unit 112 modulates the multiplexed stream transmitted by the multiplexing unit 111 into the broadcast wave and transmits the same.

(Operations)

The following describes the operations for preparing the data modules and the event messages and transmitting them to the multiplexing unit 111. Explanations of operations for transmitting audiovisual data and multiplexing the audiovisual data, the data module, and the event messages will be omitted, because those operations can be realized according to well-known technology.

Figure 10:
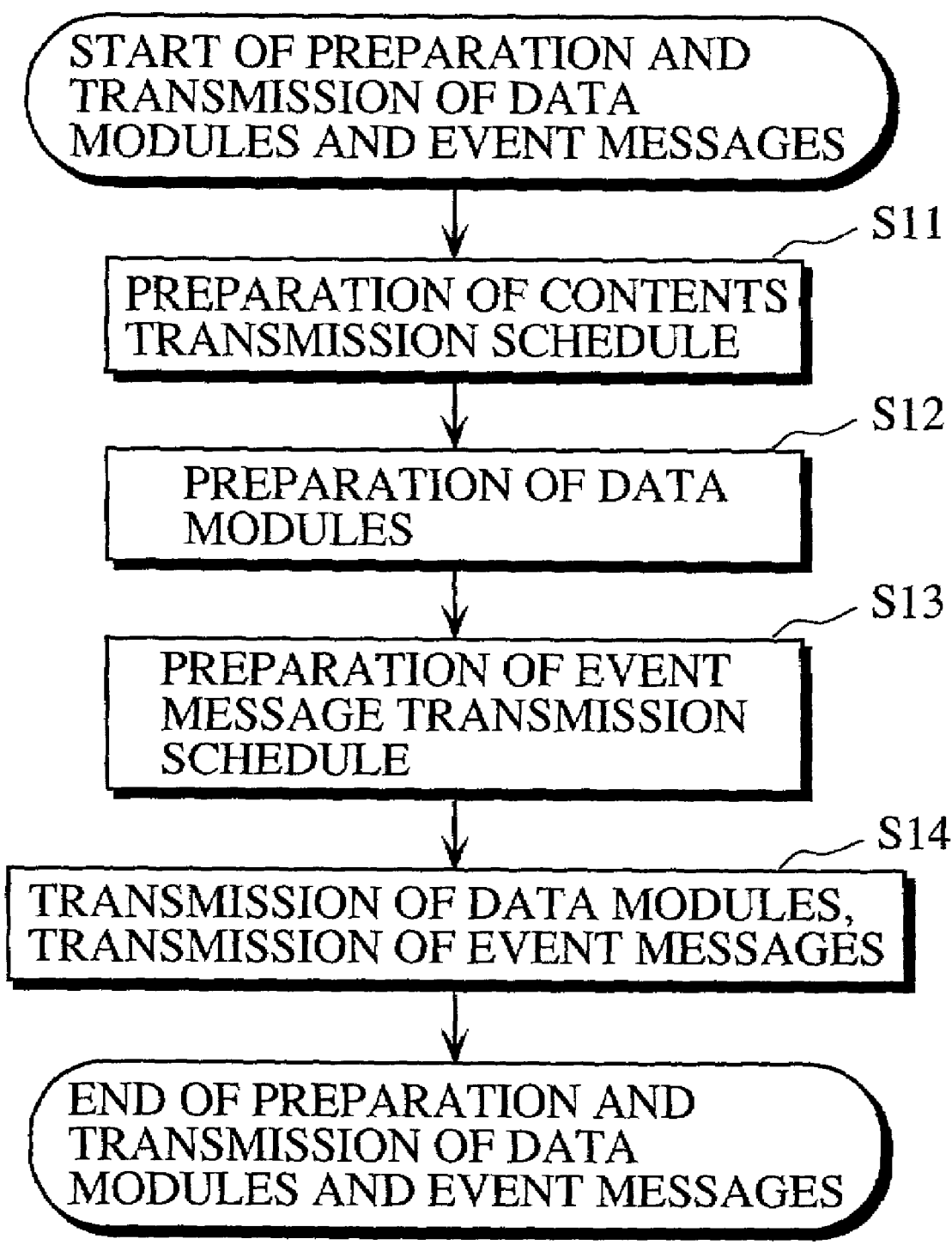
FIG. 10 is a flowchart showing the operational procedure for preparation and transmission of data modules and event messages.

FIG. 10 is a flow chart showing a procedure for preparing data modules and event messages and transmitting the same.

First, the contents transmission scheduling unit 103 prepares a contents transmission schedule in accordance with the program information stored in the program information holding unit 101 (Step S11).

Next, the data module preparation unit 104 prepares a data module using contents data stored in the contents holding unit 113 in accordance with the contents transmission schedule and outputs the data module to the data module holding unit 109 (Step S12).

Next, the event message transmission scheduling unit 105 prepares an event message transmission schedule in accordance with the contents transmission schedule and the program information (Step S13).

Next, the data module transmission controlling unit 108 reads the data module from the data module holding unit 109 in accordance with the contents transmission schedule and transmits the data module to the multiplexing unit 111. In addition, the event message transmission controlling unit 110 generates event messages in accordance with the event message transmission schedule and outputs the event messages to the multiplexing unit 111 (Step S14).

(Receiving Apparatus)

The following describes the receiving apparatus that receives the above-mentioned data transmitted by the broadcasting apparatus.

Figure 11:
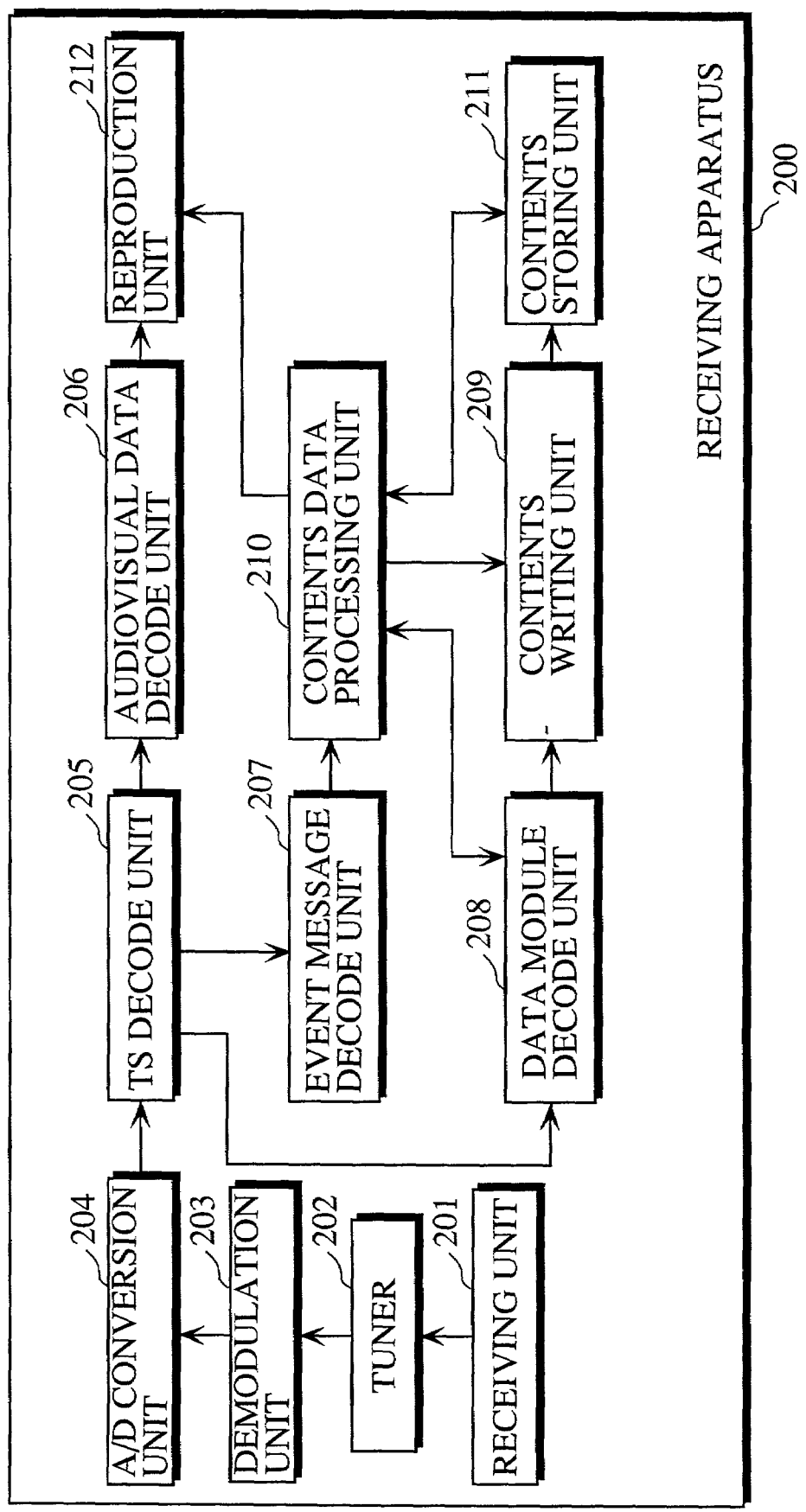
FIG. 11 is a block diagram showing the construction of the receiving apparatus.

FIG. 11 is a block diagram showing the construction of the receiving apparatus. The receiving apparatus 200 is composed of a receiving unit 201, a tuner 202, a demodulation unit 203, an A/D conversion unit 204, a TS decode unit 205, an audiovisual data decode unit 206, an event message decode unit 207, a data module decode unit 208, a contents writing unit 209, a contents data processing unit 210, a contents storing unit 211, and a reproduction unit 212.

The receiving unit 201 receives broadcast wave and is made up of a parabolic antenna and so on.

The tuner 202 tunes in to the broadcast wave to receive the broadcast wave and transmits the same to the demodulation unit 203.

The demodulation unit 203 demodulates the received broadcast wave and transmits the same to the A/D conversion unit 204.

The A/C conversion unit 204 converts the demodulated broadcast wave into digital signals to generate a TS packet.

The TS decode unit 205 decodes the TS packet to generate an audiovisual stream and a data stream.

The audiovisual data decode unit 206 decodes the audiovisual stream and transmits the same to the reproduction unit 212.

The event message decode unit 207 decodes an event message included in the data stream and transmits the same to the contents data processing unit 210.

The data module decode unit 208 decodes the data module with ID=0 in the data stream to reconstruct contents data, and when receiving the instruction to cache the contents data with the ID specified by the contents data processing unit 210, decodes the data module with the specified ID. Then, the data module decode unit 208 transmits a command included in the reconstructed contents data to the contents data processing unit 210, brings graphical images and execution scripts in the contents data into correspondence with IDs, and transmits the same to the contents writing unit 209.

The contents writing unit 209 stores the contents data transmitted from the data module decode unit 208 in the contents storing unit 211.

The contents data processing unit 210 receives the event messages from the event message decode unit 207. In case that the received message designates to delete the contents data with the specified ID, the contents data processing unit 210 deletes the contents data stored in the contents storing unit 211. In case that the received message designates to cache the contents data with the specified ID and the contents data has not been stored in the contents storing unit 211, the contents data processing unit 210 designates the data module decode unit 208 to decode the contents data with the specified ID. In case that the received message designates to reproduce the contents data, the contents data processing unit 210 reads the contents data from the contents storing unit 211 and transmits the same to the reproduction unit 212.

The contents storing unit 211 serves as a buffer for storing the contents data, while bringing the contents data into correspondence with the IDs.

The reproduction unit 212 reproduces the audiovisual data and the contents data.

Figure 12B:
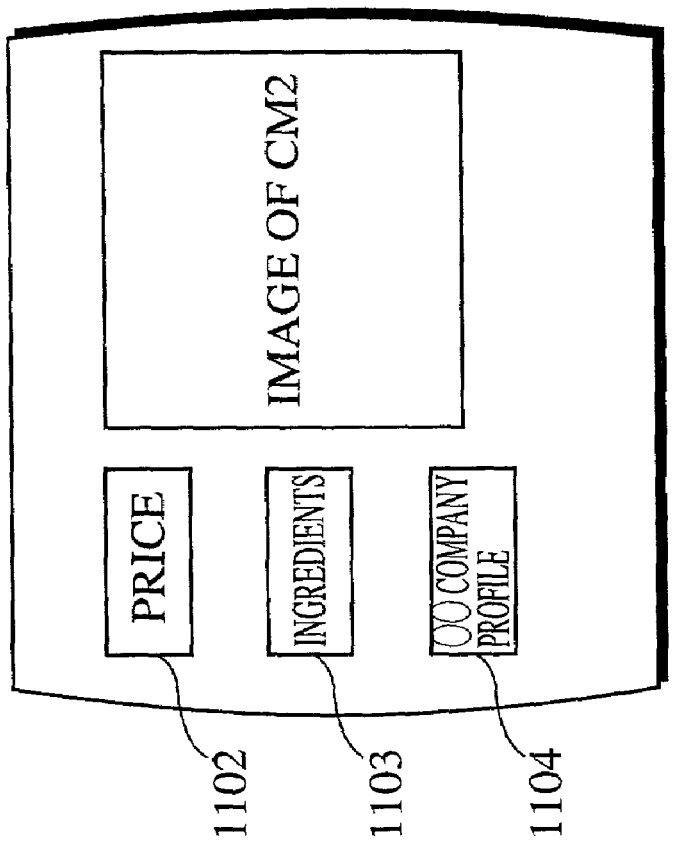
FIG. 12 shows an example of a reproduced image.
Figure 12A:
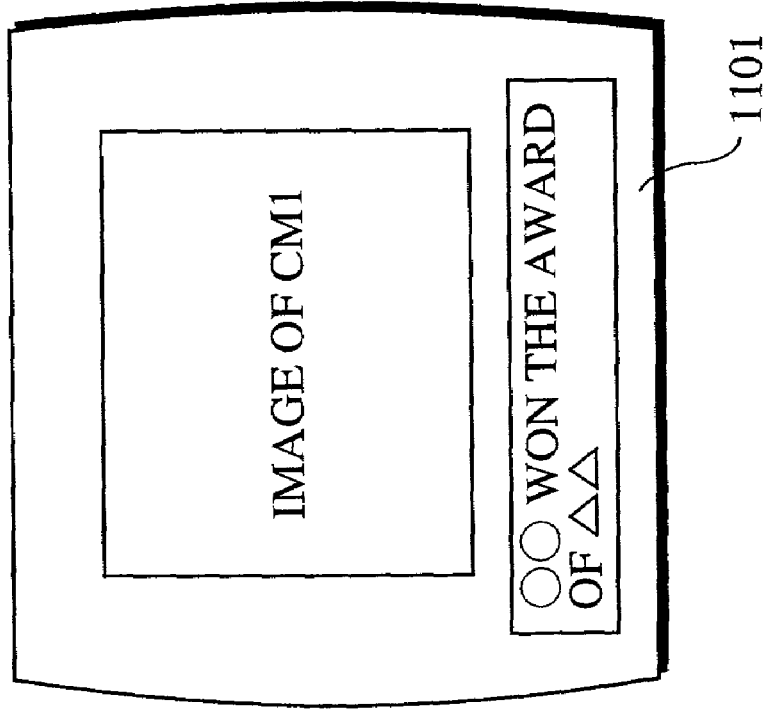

FIG. 12 shows an example of a reproduced image. As shown in FIG. 12(a), graphics 1101 is reproduced as the contents data. For another example, as shown in FIG. 12(b), graphics 1102, 1103, and 1104 are reproduced.

(Summary)

As stated above, the broadcasting apparatus according to this embodiment transmits the contents data relating to a program prior to the reproduction period of the program. Therefore, the receiving apparatus can receive the contents data before the starting time of the reproduction and reproduce the contents data from the beginning of the reproduction time of the program.

(Modifications)

The following modifications of this embodiment can achieve the same object as in the embodiment.

(1) Event Message

In this embodiment, an instruction for the receiving apparatus to cache the contents data which is transmitted before the scheduled reproduction time of the program is embedded in the data module with ID=0. However, the instruction may be transmitted as an event message.

For example, instead of embedding an instruction in the data module C1001 (ID=0 ) to cache C1002, C1003, and C1005, the instruction may be transmitted as an event message. As for contents data for control S1001, only the instruction to cache and reproduce contents data C1002 for the now being broadcasted program is embedded, and an instruction to cache the other contents data may be transmitted as an event message.

In addition, by shortening a time interval for transmitting an event message than the transmission period of the contents data, the transmitted contents data can be promptly cached. For instance, supposing the transmission period of the contents data C1002 (ID=1) is T1 (this period can be calculated using the data size of the contents data and the transmission bandwidth of the contents data which is indicated in the contents transmission schedule), an event message can be transmitted at a time interval of 0.1T1.

Figure 13:
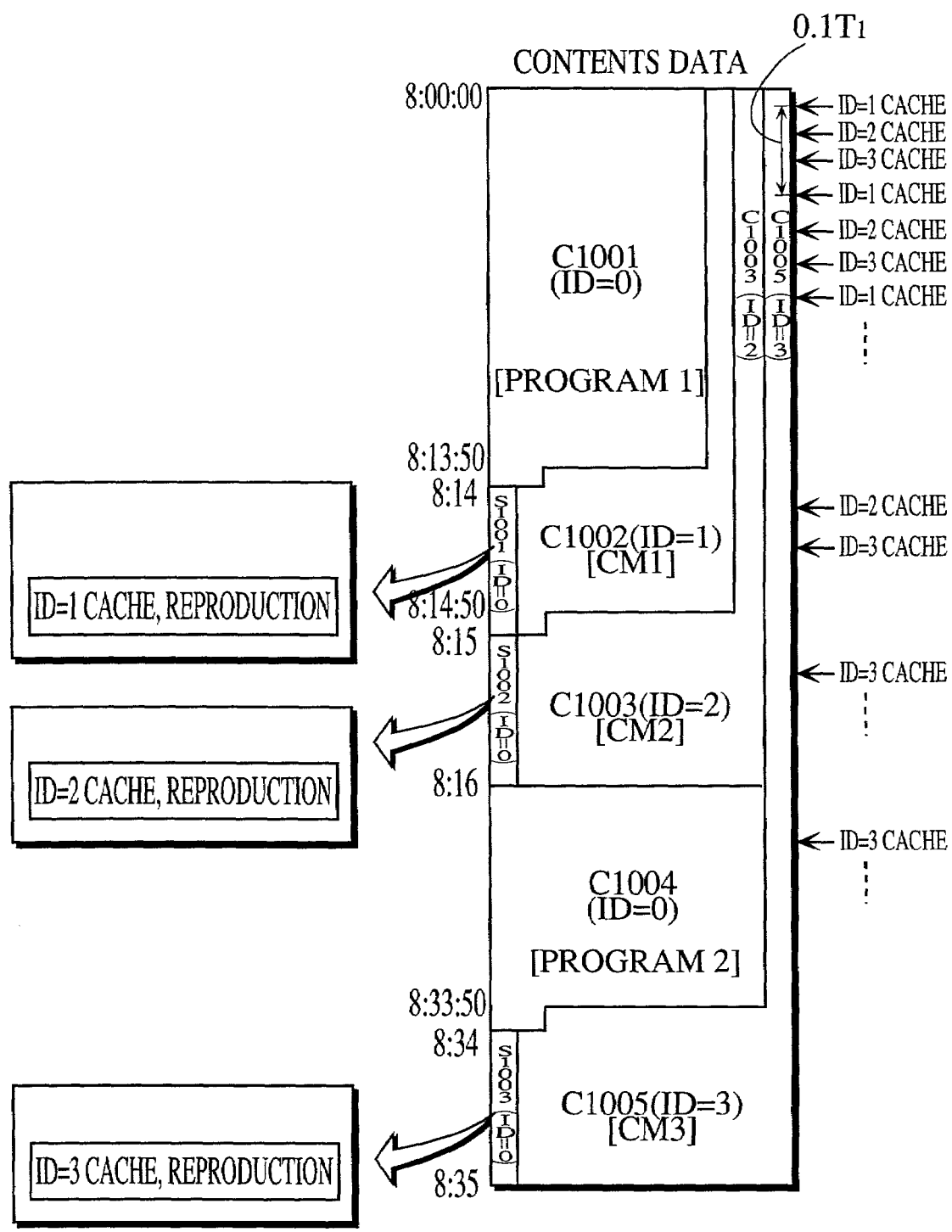
FIG. 13 shows an example of an event message transmission schedule.

FIG. 13 shows an example of an event message transmission schedule. As shown in this figure, an event message which designates the receiving apparatus to cache the contents data C1002 (ID=1), C1003 (ID=2), C1005 (ID=3) for the cache target programs are transmitted. An event message which designates to cache the contents data with ID=1 is transmitted at a time interval of 1 second, in case that T1 is set at 10 seconds.

Further, instead of embedding an instruction in the contents data for control to cache and reproduce the contents data for the now being broadcasted program, the instruction may be transmitted as an event message.

Otherwise, instructions, for example, to (a) cache the data module with the specified module ID in case of receiving the event message with event ID=1, (b) delete the data module with the specified module ID in case of receiving the event message with event ID=2, and (c) reproduce the data module with the specified module ID in case of receiving the event message with event ID=3 may be described in the specific contents data. In this state, the contents data is transmitted beforehand so that the event messages having event IDs and module IDs are transmitted and then the receiving apparatus executes the instructions. Here, the timing for transmitting these event messages can be set, for example, at the starting time of the program for reproduction, at the finishing time of the program for deletion, and at the first preceding transmission period and the second preceding transmission period for caching as described in the above first embodiment.

Alternatively, instructions, for example, to (a) cache the data module with ID=1 in case of receiving the data module with module ID=10 or detecting an update of the data module, (b) delete the data module with ID=0 in case of receiving the data module with module ID=11 or detecting an update of the data module, (c) reproduce the data module with ID=2 in case of receiving the data module with ID=12 or detecting an update of the data module may be described in the specific contents data. In this state, the contents data is transmitted beforehand, and the data modules with module ID=10, 11, and 12 are transmitted, and then the receiving apparatus executes the instructions. Here, the timing for transmitting these data modules can be set, for example, at the starting time of the program for reproduction, at the finishing time of the program for deletion, and at the first preceding transmission period and the second preceding transmission period for caching as described in the first embodiment. In addition, the detection of the update of the data module may be performed by checking a version number of the module which is described in the received data module or checking the version number of the module which is described in the other transmitted module.

Alternatively, instead of transmitting an event message which designates the receiving apparatus to promptly execute the instruction when the receiving apparatus receives the event message, an event message which designates the receiving apparatus to execute the instruction at the time specified by the received event message may be transmitted.

(2) Contents Data for Control

In this embodiment, an instruction to cache and reproduce the contents data for the cache target program in the reproduction period is embedded in the contents data for control and therefore the contents data for control becomes necessary. However, the invention can be realized without the contents data for control. For example, two types of contents data in which one contents data is transmitted before the reproduction period and the other contents data is transmitted in the reproduction period are prepared, and the ID of the former contents data is set at 1 in the same manner as in the above embodiment, while the ID of the latter contents data is set at 0. Thereby, the receiving apparatus can receive the contents data with ID=0 during the reproduction period. Alternatively, instead of changing IDs, an instruction to take the contents data with ID=1 may be transmitted as an event message. These description apply to the second to the seventh embodiments as well, which will be described later.

(3) Embedment of Instructions in Contents Data

In this embodiment, after embedding instructions for cache and reproduction in the contents data, the data module preparation unit 104 prepares the data module with ID=0 using the contents data. However, contents data in which such instructions are embedded may prepared in advance and stored in the contents holding unit 113.

(4) Transmission Band

The transmission bandwidth which is described in this embodiment is only one example, and the transmission bandwidth is not limited to this example. For instance, the following examples are applicable.

(a) When the programs other than the cache target programs are being transmitted (except for the second preceding transmission period for the cache target programs), a fixed transmission bandwidth, for example 0.3D, is allocated to all of the contents data for the cache target programs.

Figure 14:
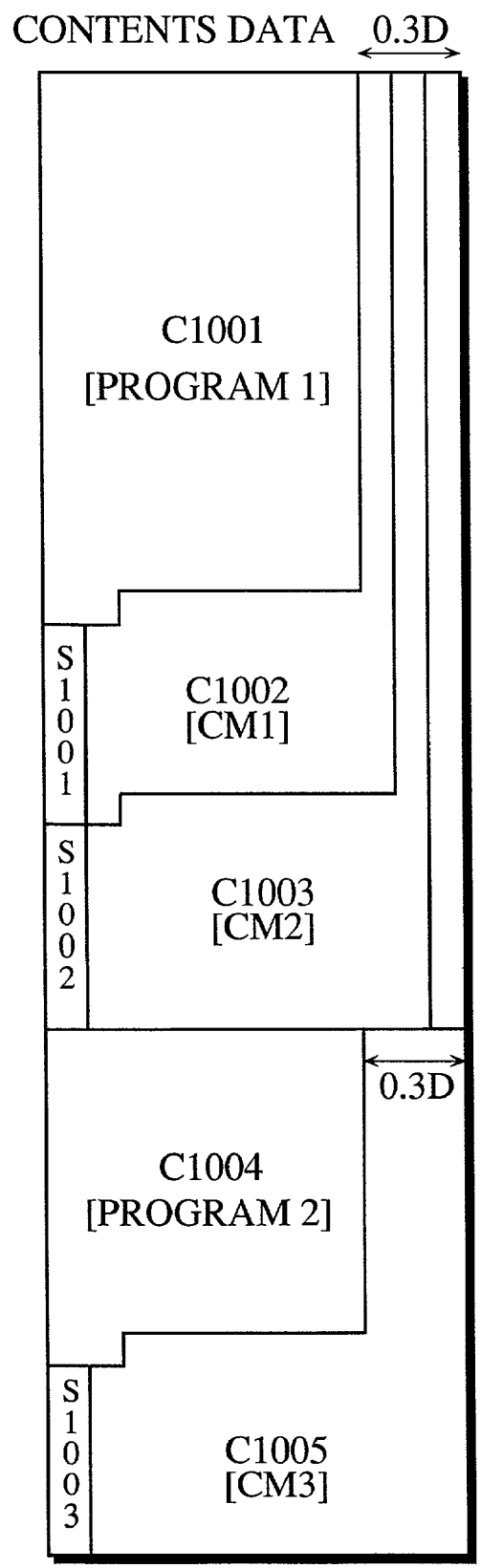
FIG. 14 shows an example of a contents transmission schedule.

FIG. 14 shows an example of a contents transmission schedule. During broadcasting of the program 1 (except for the second preceding transmission period of CM1), a transmission bandwidth of 0.1D is allocated to each of the contents data C1002, C1003, and C1005 which are transmitted as the contents data for the cache target programs. During broadcasting of the program 2 (except for the second preceding transmission period of CM3), a transmission bandwidth of 0.3D is allocated to the contents data C1005 only which is transmitted as the contents data for the cache target program.

(b) A fixed transmission bandwidth, for example 0.3D, is allocated to all of the contents data for the cache target programs to be transmitted (except for the contents data at the second preceding transmission period and at the reproduction period).

Figure 15:
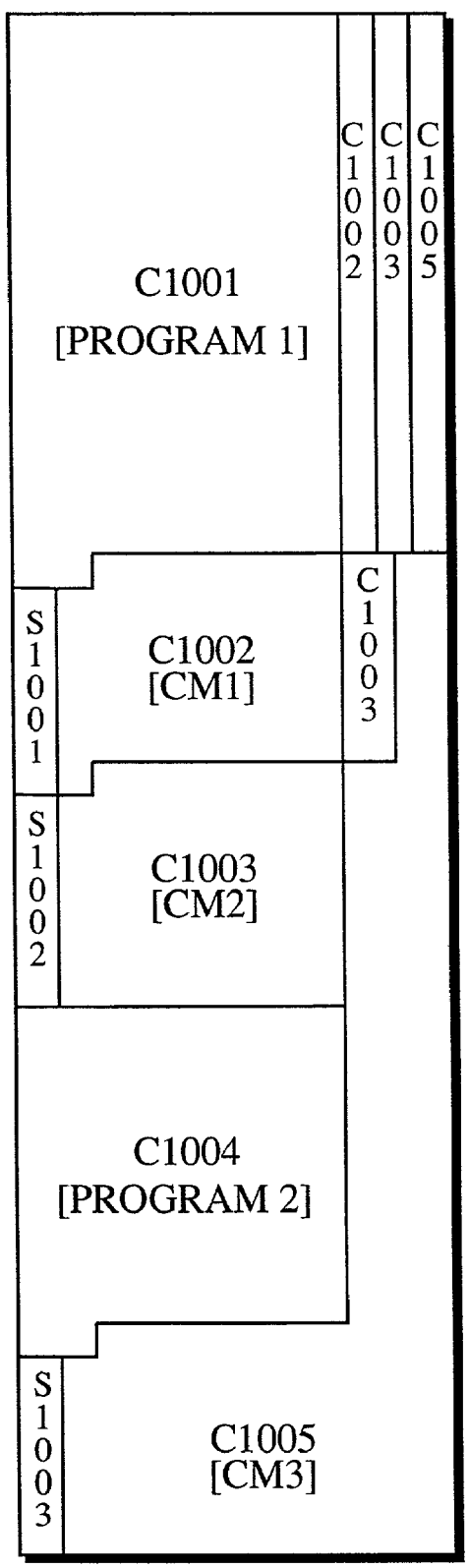
FIG. 15 shows an example of a contents transmission schedule.

FIG. 15 shows an example of a contents transmission schedule. During broadcasting of the program 1 and before the second preceding transmission period of CM1, a transmission bandwidth of 0.1D is allocated to each of contents data C1002, C1003, and C1005 which are the contents data for the cache target program to be transmitted and other than the contents data in the reproduction period and in the second preceding transmission period.

At the second preceding transmission period of CM1 and before the second preceding transmission period of CM2, a transmission bandwidth of 0.15D is allocated to each of contents data C1003 and C1005 which are the contents data for the cache target program to be transmitted and other than the contents data in the reproduction period and in the second preceding transmission period.

After the second preceding transmission period of CM2, a transmission bandwidth of 0.3D is allocated to contents data C1005 only which is the contents data for the cache target program to be transmitted and other than the contents data in the reproduction period and in the second preceding transmission period.

(5) Reproduction Instruction Message

In this embodiment, a reproduction instruction message which designates to reproduce the contents data of the program is always transmitted at the starting time of reproduction of the program. However, the reproduction instruction message may be omissible by embedding an instruction, when caching the content of the data module with the same data module ID as that of the program, to automatically reproduce the cached content.

Embodiment 2

The second embodiment is the same as the first embodiment in that contents data for cache target programs is transmitted during a time period between the first time and the finishing time of the reproduction, but is different from the first embodiment in that the transmission bandwidth for the contents data is widen from the starting time of the reproduction. Meanwhile, in the first embodiment, the transmission bandwidth is widen from the second time.

The contents transmission scheduling unit 103 determines the transmission bandwidth for contents data in accordance with the following criteria.

(Criterion A1)

The bandwidth for transmitting contents data for the cache target programs in the preceding transmission period is set at 0.1D.

(Criterion A2)

The bandwidth for transmitting contents data for control is set at 0.05D.

(Criterion A3)

The bandwidth for transmitting contents data of the program in the reproduction period is obtained by the transmission bandwidth for contents data for control 0.05D, and the transmission bandwidth for the program in the preceding transmission period, if any, from the transmission bandwidth D for all contents data.

Figure 17:
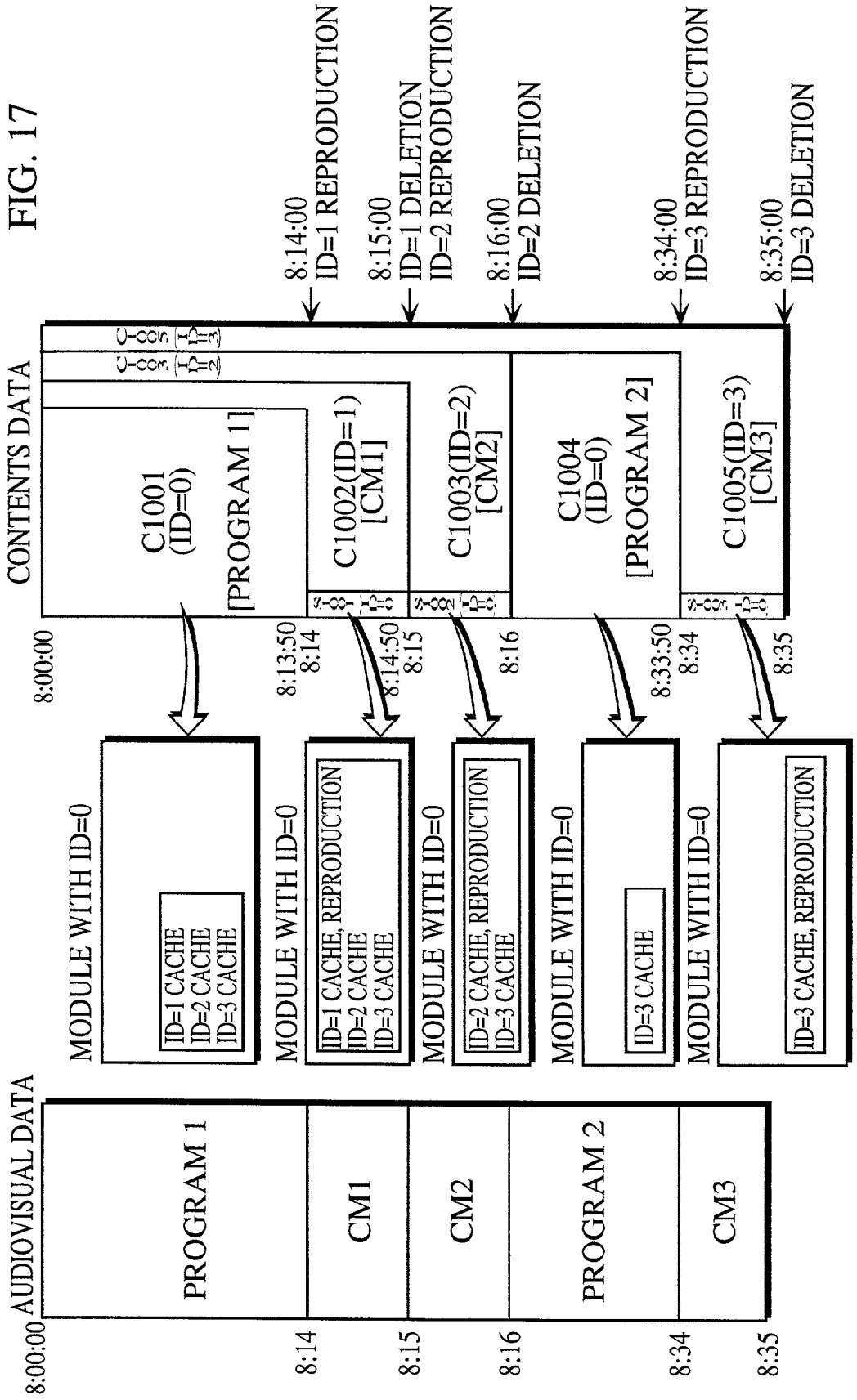
FIG. 17 shows an example of a contents transmission schedule.

FIGS. 16 and 17 show an example of a contents transmission schedule. As shown in these figures, the time period between 8:00:00 and 8:14:00 is for the reproduction period of the program 1 and the preceding transmission period of CM1, CM2, and CM3. In this period, the contents data for the program 1 (C1001) as well as the contents data for CM1, CM2, and CM3 (C1002, C1003, and C1005) are transmitted. The bandwidths for transmitting C1002, C1003, and C1005 are each set at 0.1D (according to Criterion A1), and the bandwidth for transmitting C1001 is set at 0.7D (=D−0.1D×3) (according to Criterion A3).

The time period between 8:14:00 and 8:15:00 is for the reproduction period of CM1 and the preceding periods of CM2 and CM3. In this period, the bandwidth for transmitting contents data for control S1001 is set at 0.05D (according to Criterion A2) and the bandwidths for transmitting C1003 for CM2 and C1005 for CM3 are each set at 0.1D (according to Criterion A1). The bandwidth for transmitting C1002 for CM1 is set at 0.75D (=D−0.05D−0.1D×2) (according to Criterion A3).

The time period between 8:15:00 and 8:16:00 is for the reproduction period of CM2 and the preceding transmission period of CM3. In this period, the bandwidth for transmitting contents data for control S1002 is set at 0.05D (according to Criterion A2), and the bandwidth for transmitting C1005 for CM3 is set at 0.1D (according to Criterion A1). The bandwidth for transmitting C1003 for CM 2 is set at 0.85D (=D−0.05D−0.1D) (according to Criterion A3).

Next, the time period between 8:16:00 and 8:34:00 is for the reproduction period of the program 2 and the preceding time of CM3. In this period, the bandwidth for transmitting C1005 for CM3 is set at 0.1D (according to Criterion A1) and the bandwidth for transmitting C1004 for the program 2 is set at 0.9D (=D−0.05D) (according to Criterion A3).

The time period between 8:34:00 and 8:35:00 is for the reproduction period for CM3. In this period, the bandwidth for transmitting contents data for control S1003 is set at 0.05D (according to Criterion A2), and the bandwidth for transmitting the contents data C1005 for CM3 is set at 0.95D (=D−0.05D) (according to Criterion A3).

Embodiment 3

In the first embodiment, the transmission of the contents data for the cache target programs is ended at the finishing time of reproduction of the programs. Meanwhile, in the third embodiment, a plurality of cache target programs makes up a set of cache target programs, and the contents data included in this set continues to be transmitted from a common starting time to a common finishing time which are given to the set. Here, the set of cache target programs is composed of a group of commercials provided for one data broadcasting program. The common starting time and the common finishing time are set at the starting time and the finishing time of the data broadcasting program, respectively.

The broadcasting apparatus according to the third embodiment has almost the same construction as in the broadcasting apparatus in the first embodiment, but is partially different. Therefore, the following description focuses on their difference.

The contents transmission scheduling unit 103 determines the bandwidth for transmitting contents data. That is, the contents transmission scheduling unit 103 prepares a schedule so that the contents data included in the set of cache target programs is transmitted using a narrow bandwidth from the common starting time (hereafter called a first time) to a second time which is specified for each cache target program (immediately before the starting time of reproduction), using a broad bandwidth from the second time for each program to the finishing time of reproduction of each program, and using a narrow bandwidth from the finishing time of reproduction of each program to the common finishing time (hereafter called a third time).

Hereafter, a time period between the first time (common to the programs included in the set) and the second time inherent in each program) will be referred to as the first preceding transmission period, a time period between the second time (inherent in each program) and the starting time of reproduction (inherent in each program) will be referred to as the second preceding transmission period, a time period between the starting time of reproduction (inherent in each program) and the finishing time of reproduction (inherent in each program) will be referred to as the reproduction period, and a time period between the finishing time of reproduction and the third time (common to the programs in the set) will be referred to as the post-reproduction period.

In the third embodiment, for one example, the transmission bandwidth is determined in accordance with the following criteria. Here, D indicates the bandwidth which is allocated for transmitting contents data.

(Criterion A1)

The bandwidth for transmitting contents data for the cache target programs in the first preceding transmission period and in the post-reproduction period is set at 0.1D.

(Criterion A2)

The bandwidth for transmitting contents data for control is set at 0.05D.

(Criterion A3)

The bandwidth for transmitting contents data of the program in the reproduction time is obtained by subtracting the transmission bandwidth for contents data for control 0.05D, the transmission bandwidth for the program in the first preceding transmission period, and the transmission bandwidth for the program in the second preceding transmission period, if any, from the transmission bandwidth D for all contents data.

(Criterion A4)

The bandwidth for transmitting contents data for a cache target program in the second preceding transmission period is obtained by narrowing the transmission bandwidth in the reproduction period of the cache target program by 0.2D.

FIG. 18 shows an example of a contents transmission schedule. As shown in this figure, the time period between 8:00:00 and 8:13:50 is for the first preceding transmission period of CM1, CM2, and CM3. In this period, the contents data C1001 for the program 1 which is now being broadcasted as well as the contents data C1002, C1003, and C1005 for CM1, CM2, and CM3 are transmitted. The bandwidths for transmitting C1002, C1003, and C1005 are each set at 0.1D (according to Criterion A1), and the bandwidth for transmitting C1001 is set at 0.7D (=D−0.1D×3) (according to Criterion A3).

The time period between 8:13:50 and 8:14:00 is for the second preceding transmission period of CM1 and the first preceding transmission period of CM2 and CM3. Since the bandwidth for transmitting C1002 for CM1 is obtained by narrowing the bandwidth for CM1 in the reproduction time by 0.2D, the former bandwidth is determined after determining the latter bandwidth (according to Criterion A4). The bandwidths for transmitting C1003 and C1005 for CM2 and CM3 remain 0.1D (according to Criterion A1) and the bandwidth for transmitting C1001 for the program 1 is determined after the bandwidth for transmitting the above C1002 is determined.

The time period between 8:14:00 and 8:14:50 is for the reproduction period of CM1 and for the first preceding transmission period of CM2 and CM3. The bandwidth for transmitting contents data for control S1001 is set at 0.05D (according to Criterion A2) and the bandwidths for transmitting C1003 for CM2 and C1005 for CM 3 are each set at 0.1D (according to A1). The bandwidth for transmitting C1002 for CM1 is set at 0.75D (=D−0.05D−0.1D×2) (according to Criterion A3). As a result, the bandwidth for transmitting C1002 in the second preceding transmission period of CM1 (8:13:50 to 8:14:00) becomes 0.55D which is narrower than the bandwidth in the reproduction period of the CM1 by 0.2D (according to Criterion A4) and therefore the bandwidth for transmitting C1001 becomes 0.25D (=D−0.55D−0.1D×2) (according to Criterion A3).

The time period between 8:14:50 and 8:15:00 is for the reproduction time of CM1, the second preceding transmission period of CM2, and the first preceding transmission period of CM3. The bandwidth for transmitting contents data for control S1001 is set at 0.05D (according to Criterion A2), the bandwidth for transmitting C1005 for CM3 is set at 0.1D (according to Criterion A1), and the bandwidths for transmitting C1002 for CM1 and C1003 for CM2 are determined after the bandwidths for these data in the following period are determined.

The time period between 8:15:00 and 8:16:00 is for the post-reproduction period of CM1, the reproduction period of CM2, and the first preceding transmission period of CM3. In this period, the bandwidth for transmitting contents data for control S1002 is set at 0.05D (according to Criterion A2), the bandwidths for transmitting C1002 and C1005 for CM1 and CM3 are each set at 0.1D (according to Criterion A1), and the bandwidth for transmitting C1003 for CM2 is set at 0.75D (=D−0.05D−0.1D−0.1D) (according to Criterion A3). Therefore, the bandwidth for transmitting C1003 in the second preceding transmission period of CM2 (i.e., 8:14:50 to 8:15:00) becomes 0.55D which is narrower than the bandwidth in the reproduction period of CM2 by 0.2D (according to Criterion A4) and the bandwidth for transmitting C1002 for CM1 becomes 0.1D (=D−0.05D−0.75D−0.1D) (according to Criterion A3).

Next, the time period between 8:16:00 and 8:33:50 is for the reproduction period of CM1, the reproduction period of CM2, and the first preceding transmission period of CM3. The bandwidth for transmitting C1002 for CM1 is set at 0.1D (according to Criterion A1), the bandwidth for transmitting C1003 for CM2 is set at 0.1D (according to Criterion A1), and the bandwidth for transmitting C1005 for CM3 is set at 0.1D (according to Criterion A1). The bandwidth for transmitting C1004 for the program 2 is set at 0.7D (=D−0.1D−0.1D−0.1D−0.1D) (according to Criterion A3).

The time period between 8:33:50 and 8:34:00 is for the post-reproduction period of CM1 and CM2 and the second preceding transmission period of CM3. The bandwidth for transmitting C1002 for CM1 is set at 0.1D (according to Criterion A1), and the bandwidth for transmitting C1003 for CM2 is set at 0.1D (according to Criterion A1). The bandwidths for transmitting C1005 for CM3 and C1004 for the program 2 are determined after the bandwidths for these data in the following period are determined.

The time period between 8:34:00 and 8:35:00 is for the post-reproduction period of CM1 and CM2 and the reproduction period of CM3. The bandwidth for transmitting contents data for control S1003 is set at 0.05D (according to Criterion A2), the bandwidth for transmitting C1002 for CM1 is set at 0.1D (according to Criterion A1), and the bandwidth for transmitting C1003 for CM2 is set at 0.1D (according to Criterion A1). The bandwidth for transmitting C1005 for CM3 is set at 0.75D (=D−0.05D−0.1D−0.1D) (according to Criterion A3). As a result, the bandwidth for transmitting C1005 in the second preceding transmission period of CM3 (i.e., 8:33:50 to 8:34:00) becomes 0.55D which is narrower than the bandwidth in the reproduction period of CM3 by 0.2D (according to Criterion A4) and the bandwidth for transmitting C1004 for the program 2 becomes 0.25D (=D−0.1D−0.1D−0.55D) (according to Criterion A3).

The data module preparation unit 104 prepares a data module in the same manner as the first embodiment. In this embodiment, however, the contents data is transmitted for the future after the finishing time of reproduction of the cache target program as well. Therefore, the instruction to cache the contents data is embedded in the contents data with ID=0 so that the receiving apparatus takes the transmitted contents data.

The event message transmission scheduling unit 105 prepares an event message transmission schedule in the same manner as the first embodiment. In this embodiment, however, the schedule is prepared so as not to, for the future after the finishing time of reproduction of the cache target program, transmit the event message which designates to delete the contents data.

Figure 19:
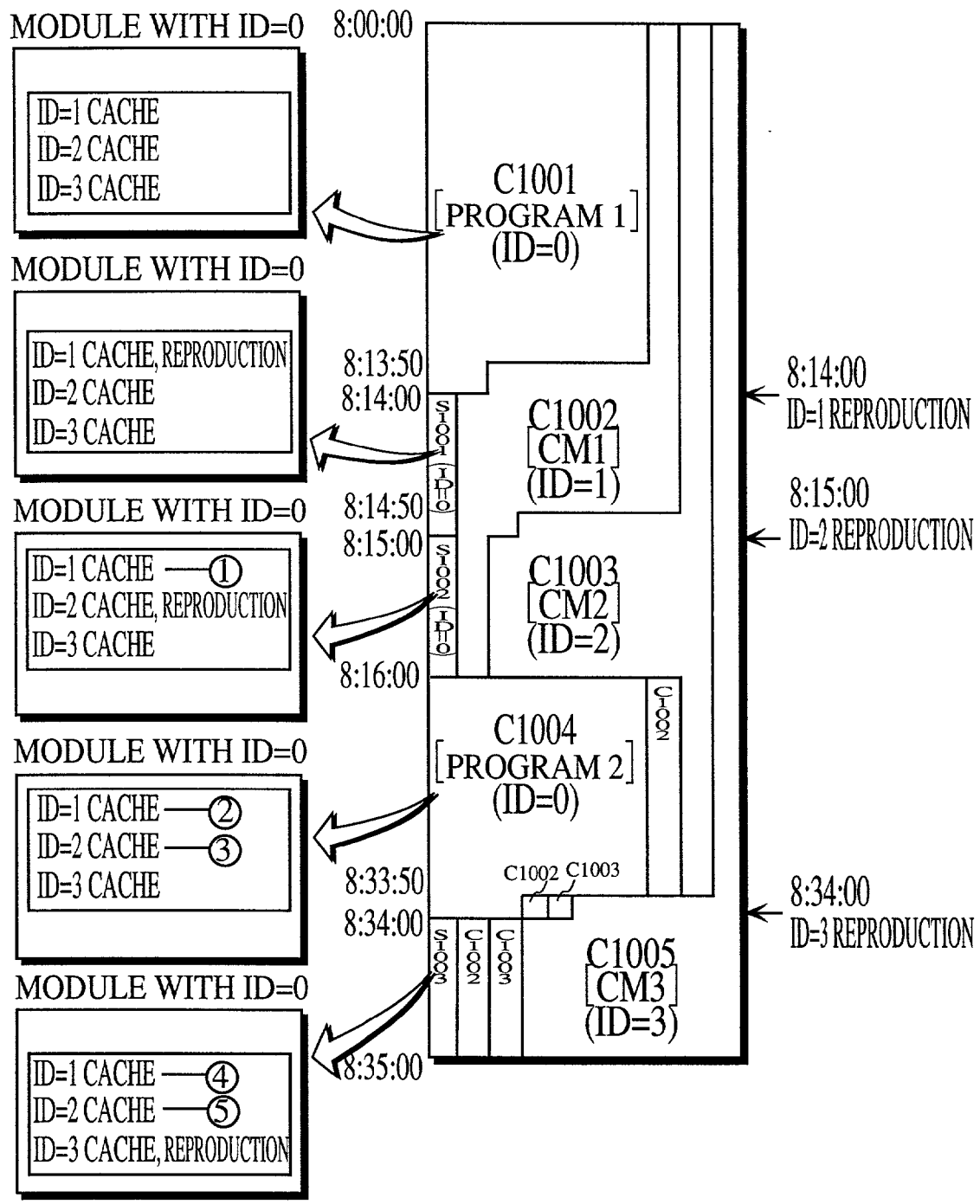
FIG. 19 shows an example of data modules and event messages.

FIG. 19 shows an example of data modules and event messages. As shown in this figure, unlike the first embodiment shown in FIG. 6, an instruction to cache the contents data with ID=1 is embedded in S1002 ((1) in FIG. 19), instructions to cache the contents data with ID=1 and ID=2 is embedded in C1004 ((2) and (3) in FIG. 19), and instructions to cache the contents data with ID=1 and ID=2 is embedded in S1003 ((4) and (5) in FIG. 19).

In addition, unlike FIG. 6, the schedule is prepared so that event messages which designate to delete the contents data of CM1, CM2, and CM3 are not transmitted at the finishing time of reproduction of CM1, CM2, and CM3 (8:15:00, 8:16:00, and 8:35:00).

(Summary)

As stated above, the broadcasting apparatus according to this embodiment transmits the contents data relating to a program prior to the reproduction period of the program. Therefore, the receiving apparatus can receive the contents data before the starting time of the reproduction and reproduce the contents data from the beginning of the reproduction time of the program. Further, after the finishing time of reproduction of the cache target program as well, the contents data relating to the program is transmitted using a narrow bandwidth. Therefore, in case that the cache target program is repeatedly broadcasted like CM, the apparatus can prepare for broadcasting of the program in the future. Further, the broadcasting apparatus according to this embodiment is effective in case that an order for reproducing a plurality of commercials is not specified.

Embodiment 4

The fourth embodiment is the same as the third embodiment in that contents data for cache target programs is transmitted during a time period between the first time and the finishing time of reproduction of a set of the cache target programs, but is different from the third embodiment in that the transmission bandwidth for the contents data is widen from the starting time of the reproduction. Meanwhile, in the third embodiment, the transmission bandwidth is widen from the second time.

The contents transmission scheduling unit 103 determines the transmission bandwidth for contents data in accordance with the following criteria. Here, D indicates the bandwidth which is allocated for transmitting all contents data.

(Criterion A1)

The bandwidth for transmitting contents data for the cache target programs in the preceding transmission period and in the post-reproduction period is set at 0.1D.

(Criterion A2)

The bandwidth for transmitting contents data for control is set at 0.05D.

(Criterion A3)

The bandwidth for transmitting contents data of the program in the reproduction time is obtained by subtracting the transmission bandwidth for contents data for control 0.05D, and the transmission bandwidth for the program in the preceding transmission period, if any, from the transmission bandwidth D for all contents data.

Figure 21:
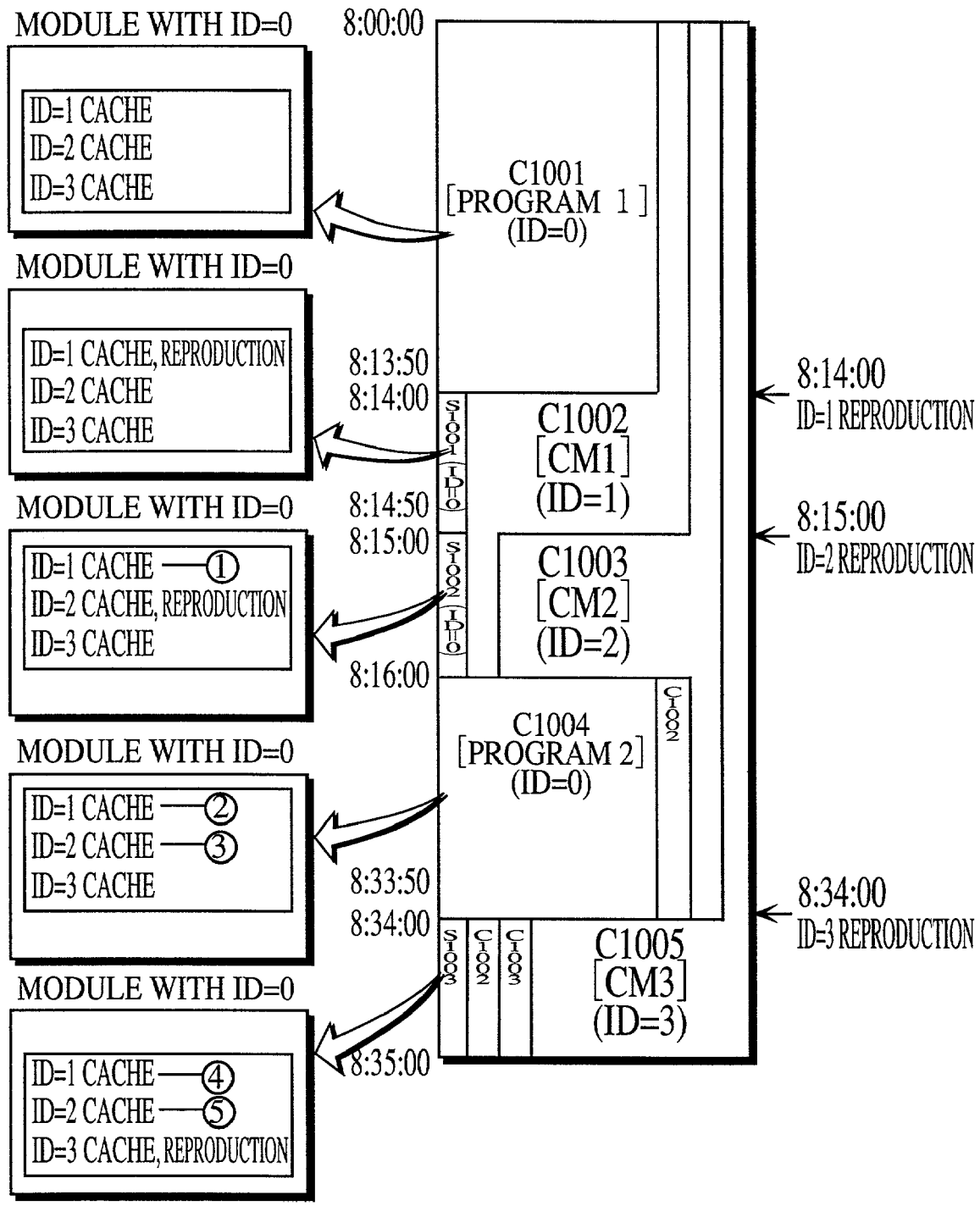
FIG. 21 shows an example of a contents transmission schedule.

FIGS. 20 and 21 show an example of a contents transmission schedule. As shown in these figures, the time period between 8:00:00 and 8:14:00 is for the preceding transmission period of CM1, CM2, and CM3. In this period, the contents data for the program 1 (C1001) as well as the contents data for CM1, CM2, and CM3 (C1002, C1003, and C1005) are transmitted. The bandwidths for transmitting C1002, C1003, and C1005 are each set at 0.1D (according to Criterion A1), and the bandwidth for transmitting C1001 is set at 0.7D (=D−0.1D×3) (according to Criterion A3).

The time period between 8:14:00 and 8:15:00 is for the reproduction period of CM1 and the preceding periods of CM2 and CM3. In this period, the bandwidth for transmitting contents data for control S1001 is set at 0.05D (according to Criterion A2) and the bandwidths for transmitting C1003 for CM2 and C1005 for CM3 are each set at 0.1D (according to Criterion A1). The bandwidth for transmitting C1002 for CM1 is set at 0.75D (=D−0.05D−0.1D×2) (according to Criterion A3).

The time period between 8:15:00 and 8:16:00 is for the post-reproduction period of CM1, the reproduction period of CM2 and the preceding transmission period of CM3. In this period, the bandwidth for transmitting C1002 for CM1 is set at 0.1D (according to Criterion A1), and the bandwidth for transmitting C1005 for CM3 is set at 0.1D (according to Criterion A1). The bandwidth for transmitting C1003 for CM2 is set at 0.75D (=D−0.05D−0.1D−0.1D) (according to Criterion A3).

Next, the time period between 8:16:00 and 8:34:00 is for the post-reproduction period of CM1, the reproduction period of CM2, and the preceding time of CM3. In this period, the bandwidth for transmitting C1002 for CM1 is set at 0.1D (according to Criterion A1), the bandwidth for transmitting C1003 for CM2 is set at 0.1D (according to Criterion A1), and the bandwidth for transmitting C1005 for CM3 is set at 0.1D (according to Criterion A1) The bandwidth for transmitting C1004 for the program 2 is set at 0.7D (=D−0.1D−0.1D−0.1D) (according to Criterion A3).

The time period between 8:34:00 and 8:35:00 is for the post-reproduction period of CM1 and CM2, and the reproduction period of CM3. In this period, the bandwidth for transmitting contents data for control S1003 is set at 0.05D (according to Criterion A2), the bandwidth for transmitting C1002 for CM1 is set at 0.1D (according to Criterion A1), and the bandwidth for transmitting C1003 for CM2 is set at 0.1D (according to Criterion A1). The bandwidth for transmitting C1005 for CM3 is set at 0.75D (=D−0.05D−0.1D−0.1D) (according to Criterion A3).

Embodiment 5

The fifth embodiment of the invention relates to a broadcasting apparatus that transmits a first type of contents data (rich version, abbreviated to "R") relating to a cache target program in the preceding transmission period of the program and transmits a second type of contents data (normal version, abbreviated to "N") from the second preceding transmission period.

The broadcasting apparatus according to the fifth embodiment has almost the same construction as in the broadcasting apparatus in the first embodiment shown in FIG. 2, but is partially different. Therefore, the following description focuses on their difference.

The program information holding unit 101 stores two types of contents management codes which correspond to the cache target program. For example, this unit stores the contents codes of NC1002 (normal version) and RC1002 (rich version) so as to correspond to CM1, the contents codes of NC1003 (normal version) and RC1003 (rich version) so as to correspond to CM2, and the contents codes of NC1005 (normal version) and RC1005 (rich version) so as to correspond to CM3.

The contents holding unit 113 stores the contents data having the above two types of contents management codes relating to the cache target program. Here, NC1002, NC1003, and NC1005 as normal version are normal graphical images whose data size is small, and RC1002, RC1003, and RC1005 as rich version are computer-graphics images of high quality which has the same content as the normal version of contents data but whose data size is large.

The contents transmission scheduling unit 103 prepares a schedule so that mutually different types of contents data are transmitted in the first preceding transmission period, the second preceding transmission period, the reproduction period. FIG. 22 shows an example of a contents transmission schedule.

(Criterion A1)

The bandwidth for transmitting contents data for the cache target programs in the first preceding transmission period is set at 0.1D. Only R is transmitted in the first preceding transmission period.

(Criterion A2)

The bandwidth for transmitting contents data for control is set at 0.05D.

(Criterion A3)

The bandwidth for transmitting contents data of the program in the reproduction time is obtained by subtracting the transmission bandwidth for contents data for control 0.05D, and the transmission bandwidths for the programs in the first and second preceding transmission periods, if any, from the transmission bandwidth D for the contents data. Only N is transmitted in the reproduction period.

(Criterion A4)

The bandwidth for transmitting contents data for a cache target program in the second preceding transmission period is obtained by narrowing the transmission bandwidth of the cache target program in the reproduction period by 0.2D. In the second preceding transmission period, R and N are transmitted. The transmission bandwidth for R is the same as in the first preceding transmission period and the remaining bandwidth is allocated to N.

FIG. 22 shows an example of a contents transmission schedule. As shown in this figure, the time period between 8:00:00 and 8:13:50 is for the reproduction period of the program 1 and the first preceding transmission period of CM1, CM2, and CM3, and therefore contents data C1001 for the program 1 as well as contents data RC1002, RC1003, and RC1005 for CM1, CM2, and CM3 are transmitted. The bandwidths for transmitting RC1002, RC1003, and RC1005 are each set at 0.1D (according to Criterion A1), and the bandwidth for transmitting C1001 is set at 0.7D (=D−0.1D× 3) (according to Criterion A3).

The time period between 8:13:50 and 8:14:00 is for the reproduction period of the program 1 and the second preceding transmission period of CM1, and the first preceding transmission period of CM2 and CM3. As for CM1, NC1002 and RC1002 are transmitted. The bandwidth for transmitting RC1002 is 0.1D and the bandwidth for transmitting NC1002 is determined after determining the bandwidth for NC1002 in the reproduction period, because, according to Criterion A4, the total value of the bandwidths for NC1002 and RC1002 in this period is obtained by narrowing the bandwidth for transmitting NC1002 in the reproduction period of CM1 by 0.2D. The bandwidths for transmitting RC1003 for CM2 and RC1005 for CM3 remain 0.1D (according to Criterion A1) and the bandwidth for transmitting C1001 for the program 1 is determined after determining the bandwidth for transmitting the above C1002.

The time period between 8:14:00 and 8:14:50 is for the reproduction period of CM1 and the first preceding transmission period of CM2 and CM3. The bandwidth for transmitting contents data for control S1001 is set at 0.05D (according to Criterion A2), and the bandwidths for transmitting RC1003 for CM2 and RC1005 for CM3 are each set at 0.1D (according to Criterion A1). The bandwidth for transmitting NC1002 for CM1 is set at 0.75D (=D−0.05D−0.1D×2) (according to Criterion A3). Thereby, the bandwidth for transmitting NC1002 in the second preceding transmission period of CM1 (i.e., 8:13:50 to 8:14:00) becomes 0.45D which is obtained by subtracting 0.1D allocated to RC1002 from 0.55D which is narrower than the bandwidth in the reproduction time of CM1 by 0.2D (according to Criterion A4) The bandwidth for transmitting C1001 becomes 0.25D (=D−0.45D−0.1D×3) (according to Criterion A3).

The time period between 8:14:50 and 8:15:00 is for the reproduction period of CM1, the second preceding transmission period of CM2, and the first preceding transmission period for CM3. The bandwidth for transmitting contents data for control S1001 is set at 0.05D (according to Criterion A2), the bandwidth for transmitting RC1005 for CM3 is set at 0.1D (according to Criterion A1), and the bandwidth for transmitting RC1003 for CM2 is set at 0.1D (according to Criterion A4). The bandwidths for transmitting NC1002 for CM1 and NC1003 for CM2 are determined after determining their bandwidths in the following time period.

The time period between 8:15:00 and 8:16:00 is for the reproduction period of CM2 and the first preceding transmission period of CM3. The bandwidth for transmitting contents data for control S1002 is set at 0.05D (according to Criterion A2), the bandwidth for transmitting RC1005 for CM3 is set at 0.1D (according to Criterion A1). The bandwidth for transmitting C1003 for CM2 is set at 0.85D (=D−0.05D−0.1D) (according to Criterion A3). Thereby, the bandwidth for transmitting NC1003 in the second preceding transmission period of CM2 (i.e., 8:14:50 to 8:15:00) becomes 0.55D which is obtained by subtracting 0.1D allocated to RC1003 from 0.65D which is narrower than the bandwidth in the reproduction time of CM2 by 0.2D (according to Criterion A4). The bandwidth for transmitting NC1002 for CM1 becomes 0.2D (=D−0.05D−0.55D−0.1D−0.1D) (according to Criterion A3).

Next, the time period between 8:16:00 and 8:33:50 is for the reproduction period of the program 2 and the first preceding transmission period of CM3. The bandwidth for transmitting RC1005 for CM3 is set at 0.1D (according to Criterion A1), and the bandwidth for transmitting C1004 for the program 2 is set at 0.9D (=D−0.1D) (according to Criterion A3).

The time period between 8:33:50 and 8:34:00 is for the reproduction period of the program 2 and the second preceding transmission period of CM3. The bandwidths for transmitting NC1005 and RC1005 for CM3 and C1004 for the program 2 are determined after determining the bandwidth in the following time periods.

The time period between 8:34:00 and 8:35:00 is for the reproduction period of CM3. The bandwidth for transmitting contents data for control S1003 is set at 0.05D (according to Criterion A2), and the bandwidth for transmitting contents data NC1005 for CM3 is set at 0.95D (=D−0.05D) (according to Criterion A3). Thereby, the bandwidth for transmitting contents data NC1005 and RC1005 in the second preceding transmission period of CM3 (i.e., 8:33:50 to 8:34:00) becomes 0.75D which is obtained by narrowing the bandwidth in the reproduction time of CM3 by 0.2D (according to Criterion A4). The bandwidth for transmitting C1004 for the program 2 becomes 0.25D (=D−0.75D) (according to Criterion A3).

Figure 23:
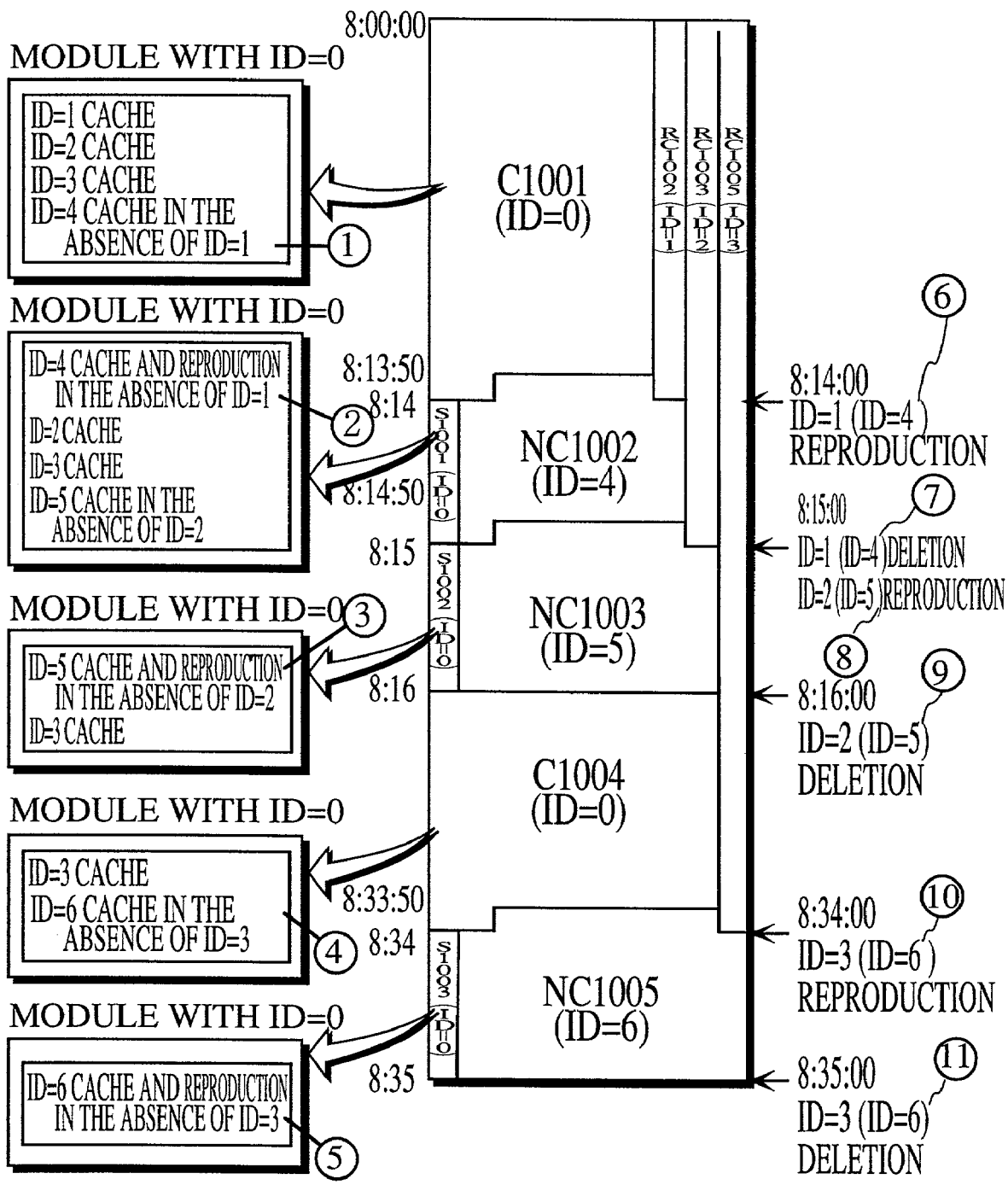
FIG. 23 shows an example of data modules and event messages.

The data module preparation unit 104 prepares different data modules from the above two types of contents data. In this case, the data module is prepared so that an ID is assigned to each of the contents data for the same cache target program, which prevents the contents data from being overwritten by the receiving apparatus. For example, as shown in FIG. 23, the data module preparation unit 104 assigns the ID of the data module prepared from NC1002 as 4 and assigns the ID of the data module prepared from RC1002 as 1. Likewise, the data module preparation unit 104 assigns the IDs of the data modules prepared from NC1003 and RC1003 as 5 and 2, and assigns the IDs of the data modules prepared from NC1005 and RC1005 as 6 and 3.

In addition, the data module preparation unit 104 embeds an instruction to cache contents data in the data module with ID=0 in the similar manner as the first embodiment. In this embodiment, however, two types of contents data (i.e., N and R) are transmitted for one cache target program, and then the receiving apparatus reproduces R prior to N, because R is on a higher level than N. Therefore, when R has been cached, there is no need for the receiving apparatus to cache N in addition to R. Thus, the data module preparation unit 104 embeds an instruction to cache R and an instruction to cache N in case that R for the same program has not been cached in the data module with ID=0.

The event message transmission scheduling unit 105 prepares a schedule in the similar manner as the first embodiment. In this embodiment, however, a transmission schedule is prepared so that a message which designates to reproduce R or N is transmitted at the starting time of reproduction of the cache target program (the receiving apparatus reproduces one of them which has been cached) and a message which designates to delete R or N is transmitted at the finishing time of reproduction of the cache target program (the receiving apparatus deletes one of them which has been cached).

FIG. 23 shows an example of data modules and event messages. As shown in this figure, unlike the first embodiment shown in FIG. 6, an instruction to cache the contents data with ID=4 (NC1002) is embedded in C1001 in the absence of the contents data with ID=1 (RC1002) ((1) in FIG. 23). An instruction to cache and reproduce the contents data with ID=4 (NC1002) is embedded in S1001 in the absence of the contents data with ID=1 (RC1002) ((2) in FIG. 23). An instruction to cache and reproduce the contents data with ID=5 (NC1003) is embedded in S1002 in the absence of the contents data with ID=2 (RC1003) ((3) in FIG. 23). An instruction to cache the contents data with ID=6 (NC1005) is embedded in C1004 in the absence of the contents data with ID=3 (RC1005) ((4) in FIG. 23). An instruction to cache and reproduce the contents data with ID=6 (NC1005) is embedded in S1003 in the absence of the contents data with ID=3 (RC1005) ((5) in FIG. 23)

In addition, unlike FIG. 6, the schedule is prepared as follows: That is, an event message which designates to reproduce the contents data with ID=1 (RC1002) or ID=4 (NC1002) in the absence of the contents data with ID=1 is transmitted at the starting time of reproduction of CM1 (8:14:00) ((6) in FIG. 23).

In addition, an event message which designates to delete the contents data with ID=1 (RC1002) or ID=4 (NC1002) in the absence of the contents data with ID=1 is transmitted ((7) in FIG. 23), and an event message which designates to reproduce the contents data with ID=2 (RC1003) or ID=5 (NC1003) in the absence of the contents data with ID=2 is transmitted ((8) in FIG. 23) at the finishing time of reproduction of CM1 and the starting time of reproduction of CM2 (8:15:00). An event message which designates to delete the contents data with ID=2 (RC1003) or ID=5 (NC1003) in the absence of the contents data with ID=2 is transmitted at the finishing time of reproduction of CM2 (8:16:00) ((9) in FIG. 23). An event message which designates to reproduce the contents data with ID=3 (RC1005) or ID=6 (NC1005) in the absence of the contents data with ID=3 is transmitted at the starting time of reproduction of CM3 (8:34:00) ((10) in FIG. 23). Finally, an event message which designates to delete the contents data with ID=3 (RC1005) or ID=6 (NC1005) in the absence of the contents data with ID=3 is transmitted at the finishing time of reproduction of CM3 (8:35:00) ((11) in FIG. 23).

(Summary)

As stated above, the broadcasting apparatus according to this embodiment transmits the contents data whose data size is large by spending a long time from the first preceding transmission period, and transmits the minimum contents data whose data size is and small for a short period of the second preceding transmission period. Therefore, higher quality of information can be provided for a viewer who views the program from the first preceding transmission period, and minimum information without omission can be provided for a viewer who views the program from the second preceding transmission period (immediately before the starting time of reproduction).

Here, in this embodiment, the first type of contents data (rich version) which is transmitted in the first preceding transmission period may be color graphical images, and the second type of contents data (normal version) may be monochrome graphical images. Otherwise, the first type of contents data may represent detailed information and the second type of contents data may represent simple information.

Embodiment 6

The broadcasting apparatus according to this embodiment relates to a method for adjusting the transmission bandwidth when one or more successive cache target programs make up a program block.

The broadcasting apparatus according to the sixth embodiment has almost the same construction as in the first embodiment shown in FIG. 2, but is partially different. Therefore, the following will focus on their difference.

The contents transmission scheduling unit 103 is the most distinctive element of this embodiment, and prepares a schedule so that, in case that one or more cache target programs are in series, the contents data for the programs are transmitted. In this embodiment, reproduction times of CM1, CM2, and CM3 as cache target programs are in series, and reproduction times of CM1 and CM2 as commercials are in series.

The contents transmission scheduling unit 103 prepares the transmission schedule so that the contents data of CM1, CM2, and CM3 as the cache target programs are each transmitted prior to their starting time of reproduction. For example, contents data of CM1 and CM2 are transmitted from the starting time of reproduction of the program 1 which is the immediately preceding program to the CM1 and CM2, and contents data of CM3 is transmitted from the starting time of reproduction of the program 2.

In addition, the contents transmission scheduling unit 103 determines the transmission bandwidths for the contents data. That is, the contents transmission scheduling unit 103 in this embodiment is the same as in the first embodiment in that contents data for cache target programs are transmitted using a narrow bandwidth from the first time and the second time (i.e., the first preceding transmission period) before the starting time of reproduction of the cache target program, while widening the bandwidth from the second time to the finishing time of reproduction (i.e., the second preceding transmission period and the reproduction period). In this embodiment, however, the second time of the leading program in the program block is set at a time in the reproduction time of the programs other than the cache target programs, and the second time of the programs other than the leading program in the program block is set at a time in the reproduction time of the immediately preceding program in the same program block.

In this embodiment, for example, the transmission bandwidths are determined in accordance with the following criteria. Here, D indicates the bandwidth which is allocated for transmitting contents data.

(Criterion A1)

In case that a time period is for the reproduction time of a cache target program, the bandwidth for transmitting the contents data of the cache target program is set at 0.1D.

(Criterion A2)

In case that a time period is for the second preceding transmission period of the leading program in a program block, the bandwidth for transmitting contents data of the program in the reproduction time is set at 0.2D. The bandwidth for transmitting the contents data of the program in the second preceding transmission period is obtained by subtracting the above bandwidth for transmitting contents data of the program in the reproduction time and the bandwidth for transmitting the contents data of the program in the first preceding transmission period, if any, from the transmission bandwidth D for all contents data.

(Criterion A3)

In case that a time period is for the second preceding transmission period of the programs other than leading program in a program block, the bandwidth for transmitting contents data of the program in the reproduction time is set at 0.5D. The bandwidth for transmitting the contents data of the program in the second preceding transmission period is obtained by subtracting the above bandwidth for transmitting contents data of the program in the reproduction time and the bandwidth for transmitting the contents data of the program in the first preceding transmission period, if any, from the transmission bandwidth D for all contents data.

(Criterion A4)

In case that a time period is for the reproduction period of a program (irrespective of cache target or not) and does not apply to the above (A2) and (A3), the bandwidth for transmitting contents data of the program in the reproduction time is obtained by subtracting the bandwidth for transmitting contents data of the program in the first preceding transmission period, if any, from the transmission bandwidth D for all contents data.

FIG. 24 shows an example of contents transmission schedule. As shown in this figure, the time period between 8:00:00 and 8:13:50 is for the reproduction period of the program 1 and the first preceding transmission period of CM1 and CM2. In this period, contents data C1001 for the program 1 which is now being broadcasted as well as contents data C1002 and C1003 for CM1 and CM2 are transmitted. The bandwidths for transmitting C1002 and C1003 are each set at 0.1D (according to Criterion A1), and the bandwidth for transmitting C1001 is set at 0.8D (=D−0.1D×2) (according to Criterion A4).

The time period between 8:13:50 and 8:14:00 is for the reproduction period of the program 1, the second preceding transmission period of CM1, and the first preceding transmission period of CM2. The bandwidth for transmitting C1001 for the program 1 is set at 0.2D (according to Criterion A2), the bandwidth for transmitting C1003 for CM2 remains 0.1D (according to Criterion A1), and the bandwidth for transmitting C1002 for CM1 is set at 0.7D (=D−0.2D−0.1D) (according to Criterion A2).

The time period between 8:14:00 and 8:14:50 is for the reproduction period of CM1 and the first preceding transmission period of CM2. The bandwidth for transmitting C1003 for CM2 is set at 0.1D (according to Criterion A1), and the bandwidth for transmitting C1002 for CM1 is set at 0.9D (=D−0.1D) (according to Criterion A4).

The time period between 8:14:50 and 8:15:00 is for the reproduction period of CM1 and the second preceding transmission period of CM2. The bandwidth for transmitting C1002 for CM1 is set at 0.5D (according to Criterion A3), and the bandwidth for transmitting C1003 for CM2 is set at 0.5D (according to Criterion A3).

The time period between 8:15:00 and 8:16:00 is for the reproduction period of the CM2. The bandwidth for transmitting C1003 for CM2 is set at 1D (according to Criterion A4).

Next, the time period between 8:16:00 and 8:33:50 is for the reproduction period of the program 2 and the first preceding transmission period of CM3. The bandwidth for transmitting C1005 for CM3 is set at 0.1D (according to Criterion A1), and the bandwidth for transmitting C1004 for the program 2 is set at 0.9D (=D−0.1D) (according to Criterion A4).

The time period between 8:33:50 and 8:34:00 is for the reproduction period of the program 2 and the second preceding transmission period of CM3. The bandwidth for transmitting C1004 for the program 2 is set at 0.2D (according to Criterion A2) and the bandwidth for transmitting C1005 for CM3 is set at 0.8D (=D−0.2D) (according to Criterion A2).

The time period between 8:34:00 and 8:35:00 is for the reproduction period of CM3. The bandwidth for transmitting C1005 for CM3 is set at 1D (according to Criterion A4).

The data module preparation unit 104 prepares a data module in the almost same manner as in the first embodiment. In this embodiment, however, an instruction to cache contents data is not embedded in a data module. Instead, the instruction is transmitted as an event message (this is the same as in the above-mentioned modifications).

The event message transmission scheduling unit 105 refers to the contents transmission schedule prepared by the contents transmission scheduling unit 103 and prepares an event message transmission schedule. There are three types of event messages which each designate to delete, reproduce, and cache the specified contents data. When the receiving apparatus receives the event message which designates to delete the contents data, the receiving apparatus deletes the contents data from the recording apparatus. When the receiving apparatus receives the event message which designates to reproduce the contents data, the receiving apparatus reads and the contents data from the recording apparatus and reproduce the same. When the receiving apparatus receives the instruction to record the contents data and in case that the contents data has not been recorded, then the receiving apparatus writes the received contents data in the recording apparatus.

The event message transmission scheduling unit 105 refers to the contents transmission schedule and the program information, and prepares a schedule for transmitting an event message which designates to delete contents data from the recording apparatus or to reproduce contents data in the recording apparatus in accordance with the following criteria.

(Criterion B1)

The schedule is prepared so that an event message which designates to delete the contents data for the program is transmitted at the finishing time of the program. Here, the data module with ID=0 which corresponds to the contents data is exception to this Criterion.

(Criterion B2)

The schedule is prepared so that an event message which designates to cache the contents data for a cache target program from the beginning of the first preceding transmission period to the starting time of reproduction of the cache target program is transmitted. The transmission period of the event message is set at ¹⁄₁₀ of the period T, where T is the repetition period for performing carousel transmission of the contents data in the first preceding transmission period.

(Criterion B3)

The schedule is prepared so that an event message which designates to cache and reproduce the contents data for a cache target program from the starting time of reproduction of the program to the finishing time of reproduction. The transmission period of the event message is set at the same as in the above Criterion B2.

Figure 25:
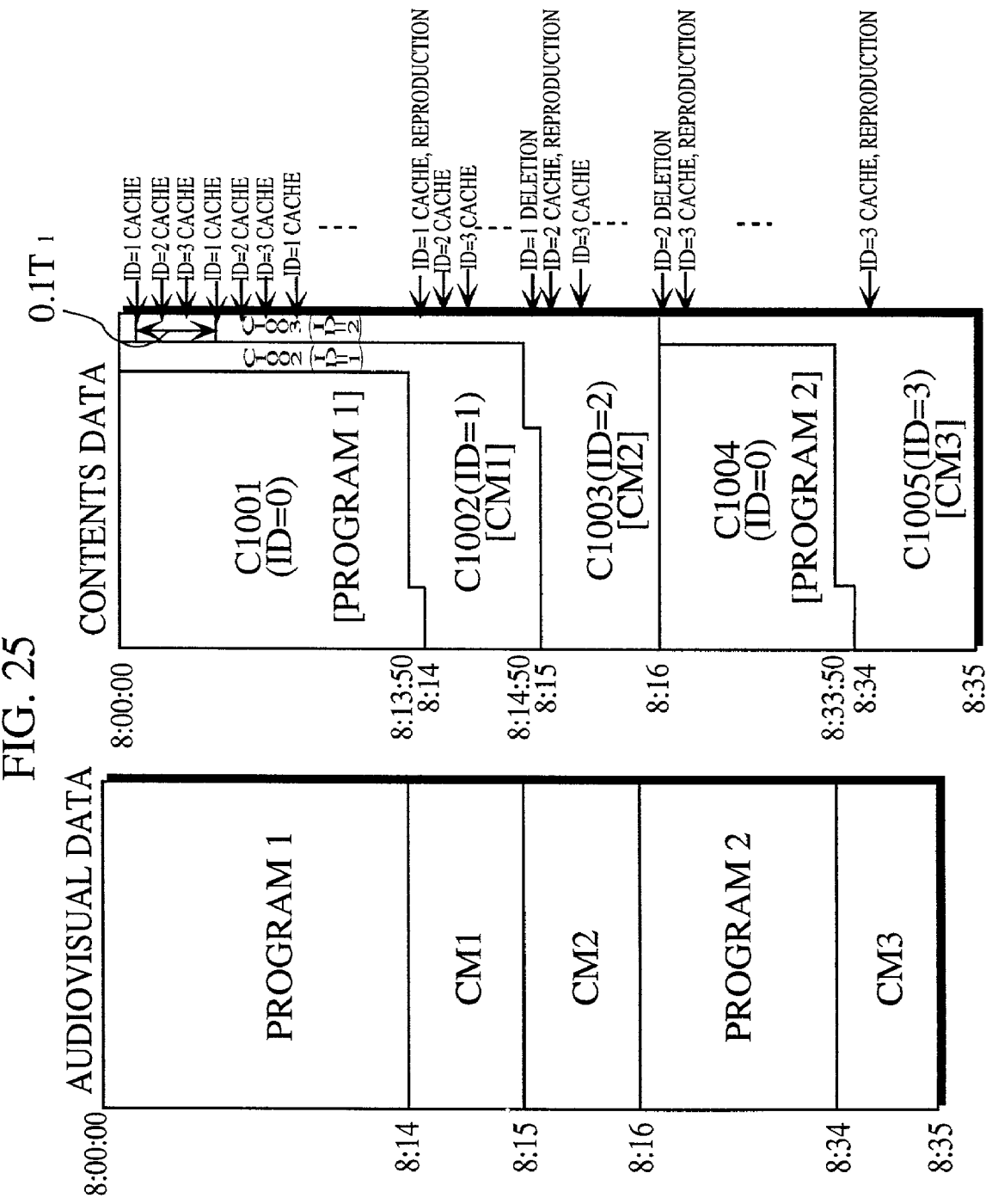
FIG. 25 shows an event message transmission schedule as well as a contents transmission schedule.

FIG. 25 shows the event message transmission schedule and the contents transmission schedule. In this figure, T1 indicates the period for carousel transmission of the contents with ID=1 in the first preceding transmission period. As shown in this figure, as for C1002 (ID=1) for example, the event message which designates to cache the contents data is transmitted at the interval of 0.1T1 from the beginning of the first preceding transmission period (8:00:00) to the starting time of reproduction (8:14:00) (according to Criterion B2), the event message which designates to cache and reproduce the contents data is transmitted at the interval of 0.1T1 from the starting time of reproduction (8:14:00) to the finishing time of reproduction (8:15:00) (according to Criterion B3), and the event message which designates to delete the contents data is transmitted at the finishing time of reproduction (8:15:00). The schedule is prepared relating to C1003 and C1005 in the same manner.

(Summary)

As stated above, according to the broadcasting apparatus of this embodiment, in the second preceding transmission period of the programs other than the leading program in a program block (i.e., immediately before the changing time of the programs in the program block), the bandwidth for transmitting contents data for the programs is set at the predetermined bandwidth or broader, and the bandwidth for transmitting the contents data in the reproduction period is also set at the predetermined bandwidth or broader. Therefore, a user who views the program from the above second preceding transmission period can acquire the contents data of the following program for a short period of time as well as the contents data for the program in the reproduction period.

Here, in this embodiment, contents data for control is not transmitted. However, in case that the receiving apparatus must receive the contents data with ID=0, contents data for control which includes only the instruction to follow the instruction from the event message may be transmitted.

Embodiment 7

The broadcasting apparatus according to this embodiment relates to a method for adjusting the transmission bandwidth when a plurality of successive cache target programs makes up a program block.

The broadcasting apparatus according to the seventh embodiment has almost the same construction as in the sixth embodiment shown, but is partially different. Therefore, the following will focus on their difference.

The contents transmission scheduling unit 103 is the most distinctive element of this embodiment, and determines the transmission bandwidths for contents data.

That is, as for the leading program in a program block, the contents transmission scheduling unit 103 in this embodiment determines the transmission bandwidth so that contents data for the program is transmitted using a narrow bandwidth from the first time to the second time (i.e., the first preceding transmission period), while widening the bandwidth from the second time to the finishing time of reproduction (i.e., the second preceding transmission period and the reproduction period). In this embodiment, the second time is set at a time in the reproduction time of the programs other than the cache target programs.

As for the programs other that the leading program in the program block, the contents transmission scheduling unit 103 determines the transmission bandwidth so that contents data for the programs are transmitted using a narrow bandwidth from the first time to the starting time of reproduction (i.e., the first preceding transmission period), while widening the bandwidth from the starting time of reproduction to the finishing time of reproduction (i.e., reproduction period).

In this embodiment, for example, the transmission bandwidths are determined in accordance with the following criteria. Here, D indicates the bandwidth which is allocated for transmitting contents data.

(Criterion A1)

In case that a time period is for the reproduction time of a cache target program, the bandwidth for transmitting the contents data of the cache target program is set at 0.1D.

That is, the contents data for the cache target programs are gradually transmitted by using a narrow bandwidth and spending a long time, because with decreasing the bandwidth for transmitting the contents data for the program which is now being broadcasted, it takes a longer time to acquire contents data of the program.

(Criterion A2)

In case that a time period is for the second preceding transmission period of the leading program in a program block, the bandwidth for transmitting contents data of the program in the reproduction time is set at 0.2D. The bandwidth for transmitting the contents data of the program in the second preceding transmission period is obtained by subtracting the above bandwidth for transmitting contents data of the program in the reproduction time and the bandwidth for transmitting the contents data of the program in the first preceding transmission period, if any, from the transmission bandwidth D for all contents data.

(Criterion A3)

In case that a time period is for the reproduction period of a program (irrespective of cache target or not) and does not apply to the above (A2), the bandwidth for transmitting contents data of the program in the reproduction time is obtained by subtracting the bandwidth for transmitting contents data of the program in the first preceding transmission period, if any, from the transmission bandwidth D for all contents data.

FIG. 26 shows an example of a contents transmission schedule. As shown in this figure, the time period between 8:00:00 and 8:13:50 is for the reproduction period of the program 1 and the first preceding transmission period of CM1 and CM2. In this period, contents data C1001 for the program 1 which is now being broadcasted as well as contents data C1002 and C1003 for CM1 and CM2 are transmitted. The bandwidths for transmitting C1002 and C1003 are each set at 0.1D (according to Criterion A1), and the bandwidth for transmitting C1001 is set at 0.8D (=D−0.1D×2) (according to Criterion A3).

The time period between 8:13:50 and 8:14:00 is for the reproduction period of the program 1, the second preceding transmission period of CM1, and the first preceding transmission period of CM2. The bandwidth for transmitting C1001 for the program 1 is set at 0.2D (according to Criterion A2), the bandwidth for transmitting C1003 for CM2 remains 0.1D (according to Criterion A1), and the bandwidth for transmitting C1002 for CM1 is set at 0.7D (=D−0.2D−0.1D) (according to Criterion A2).

The time period between 8:14:00 and 8:14:50 is for the reproduction period of CM1 and the first preceding transmission period for CM2. The bandwidth for transmitting C1003 for CM2 is set at 0.1D (according to Criterion A1), and the bandwidth for transmitting C1002 for CM1 is set at 0.9D (=D−0.1D) (according to Criterion A3).

The time period between 8:14:50 and 8:15:00 is for the reproduction period of CM1 and the first preceding transmission period of CM2. The bandwidth for transmitting C1003 for CM2 is set at 0.1D (according to Criterion A1), and the bandwidth for transmitting C1002 for CM1 is set at 0.9D (=D−0.1D) (according to Criterion A3).

The time period between 8:15:00 and 8:16:00 is for the reproduction period of the program 2. The bandwidth for transmitting C1003 for CM2 is set at 1D (according to Criterion A3).

Next, the time period between 8:16:00 and 8:33:50 is for the reproduction period of the program 2 and the first preceding transmission period of CM3. The bandwidth for transmitting C1005 for CM3 is set at 0.1D (according to Criterion A1), and the bandwidth for transmitting C1004 for the program 2 is set at 0.9D (=D−0.1D) (according to Criterion A3).

The time period between 8:33:50 and 8:34:00 is for the reproduction period of the program 2 and the second preceding transmission period of CM3. The bandwidth for transmitting C1004 for the program 2 is set at 0.2D (according to Criterion A2) and the bandwidth for transmitting C1005 for CM3 is set at 0.8D (=D−0.2D) (according to Criterion A2).

The time period between 8:34:00 and 8:35:00 is for the reproduction period of CM3. The bandwidth for transmitting C1005 for CM3 is set at 1D (according to Criterion A3).

Figure 27:
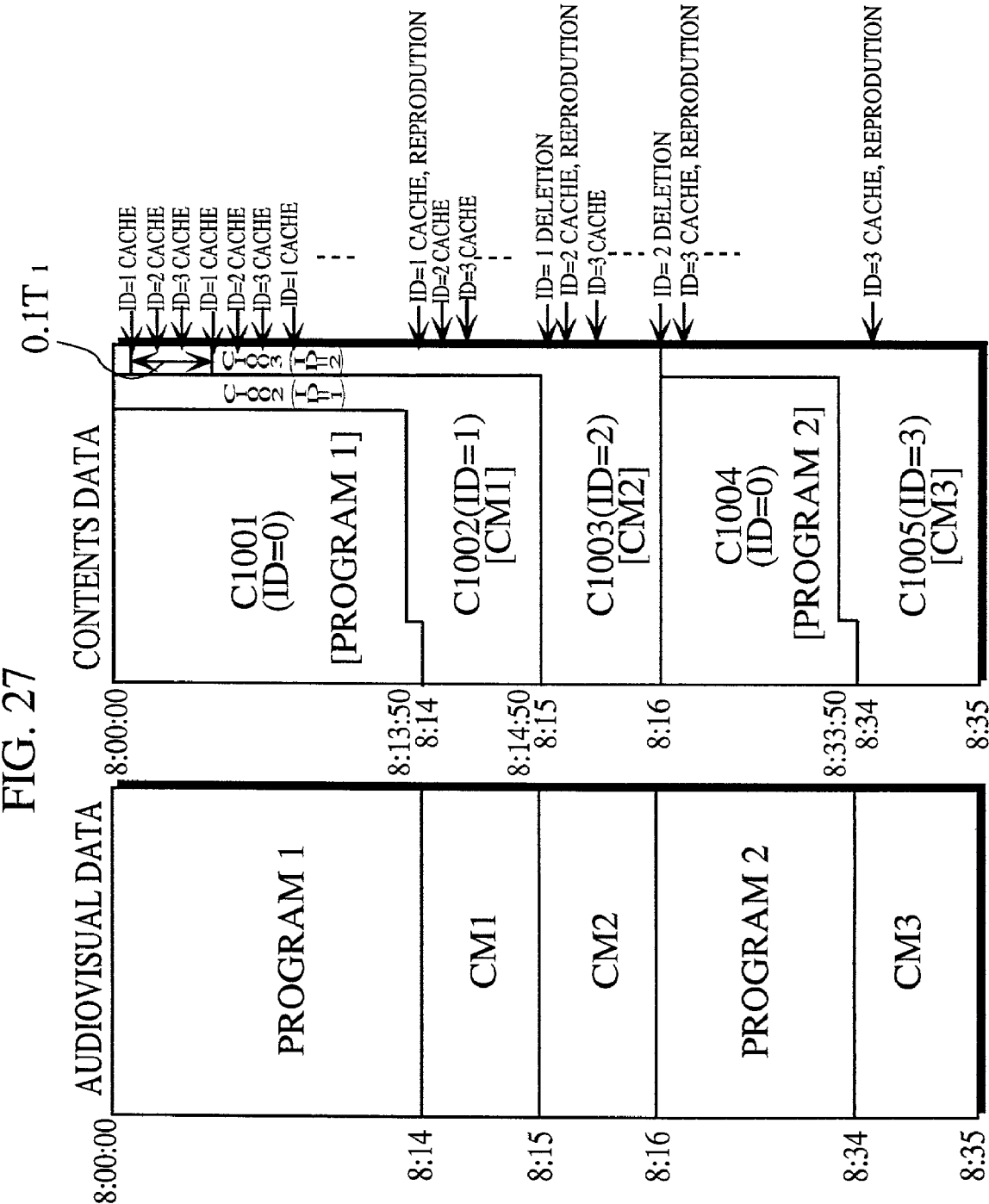
FIG. 27 shows an event message transmission schedule as well as a contents transmission schedule.

The data module preparation unit 104 and the event message transmission scheduling unit 105 according to this embodiment are the same as in the sixth embodiment. FIG. 27 shows an event message transmission schedule and a contents transmission schedule. As shown in this figure, the event message transmission schedule is the same as in the fourth embodiment shown in FIG. 25. The contents transmission schedule is the same as in the sixth embodiment shown in FIG. 25 in the first preceding transmission period of CM2, but different in the second preceding transmission period (i.e., 8:14:50 to 8:15:00).

(Summary)

As stated above, according to the broadcasting apparatus of this embodiment, in the second preceding transmission period of the program other than the leading program in a program block (i.e., immediately before the changing time of the programs in the program block) the bandwidth for transmitting contents data for the program is not widen, but the bandwidth for transmitting contents data for the program in the reproduction period is set at a predetermined bandwidth or broader. Therefore, a user who views the program from the above second preceding transmission period can view the contents data of the program in the reproduction period by priority.

(Modifications)

Although the embodiments of the broadcasting apparatus according to the invention was described as above, naturally the invention is not limited to the above embodiments. That is, naturally, the invention includes the following modifications.

(1) Carousel Transmission

In the above embodiments, contents data may be repeatedly transmitted even before the starting time of reproduction. This is effective in case that all of the transmitted contents data cannot be acquired but a part of the data is missed due to overflow from the buffer or the like. However, in case that such missing does not occur, contents data may be transmitted only once before the starting time of reproduction.

(2) Cache Target Programs

In the above embodiments, commercials are described as the cache target programs. However, normal programs may be cache target programs.

FIG. 28 shows an example in which the program 3 is a cache target program. As shown in this figure, the contents data for the program 3 is transmitted using the transmission bandwidth of 0.2D in the first preceding transmission period of the program 3 and using the transmission bandwidth of 0.75D from the second preceding transmission period of the program 3.

Figure 29:
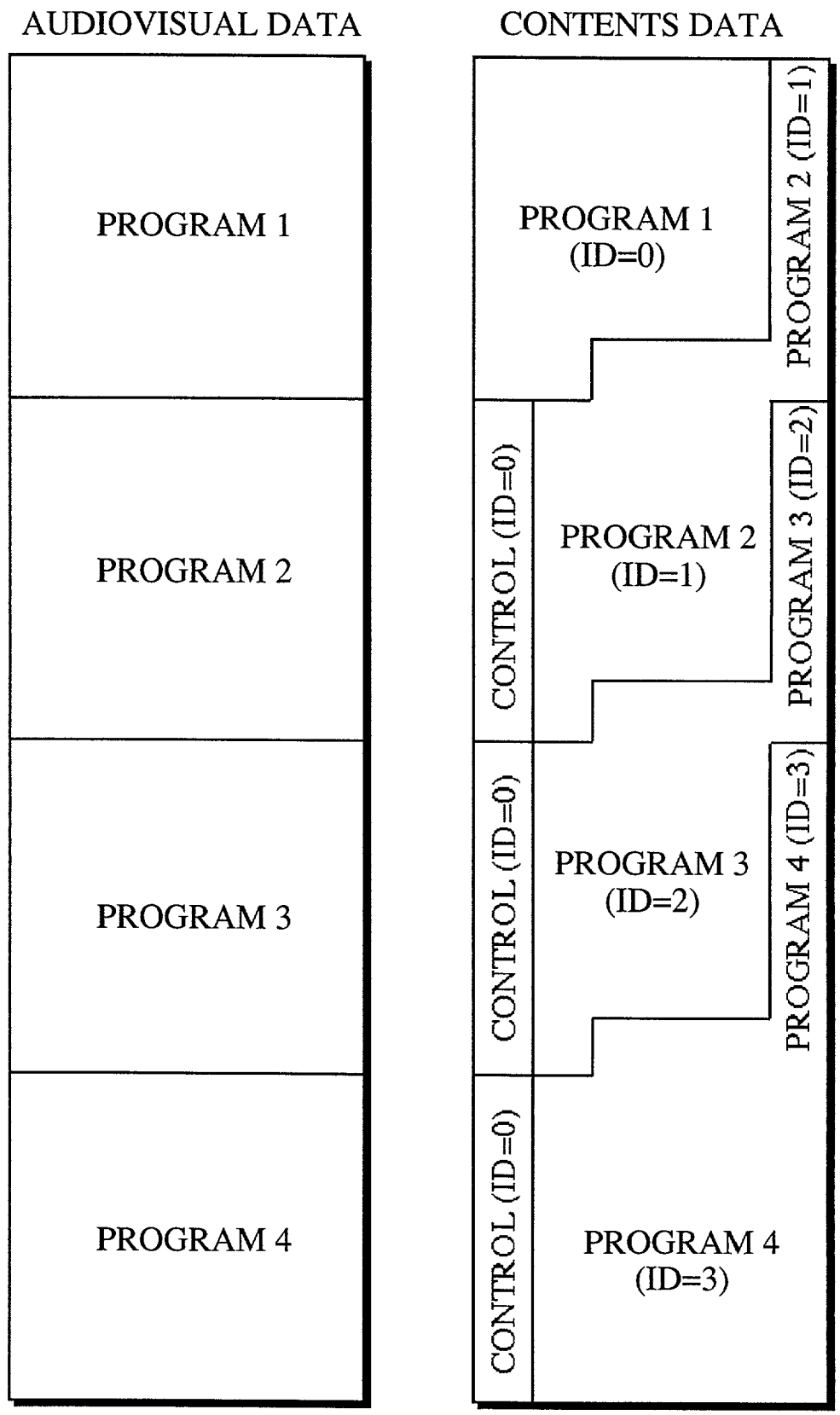
FIG. 29 shows an example in which the programs 2, 3, and 4 are cache target programs.

FIG. 29 shows another example in which the programs 2, 3, and 4 are cache target programs. As shown in this figure, the contents data for the program 3 is transmitted using the transmission bandwidth of 0.2D from the starting time of reproduction of the program 2 which is the immediately preceding program to the program 3 and using the transmission bandwidth of 0.75D from the second preceding transmission period of the program 3. Contents data for the programs 3 and 4 are transmitted in the same manner.

(3) Broadcasting Programs

The above embodiments deal with the broadcasting programs which consist of audiovisual data and contents data. However, naturally, the above embodiments are applicable to so-called data broadcasting programs which consist of contents data only.

(4) The Transmission Bands for Contents Data

Figure 30:
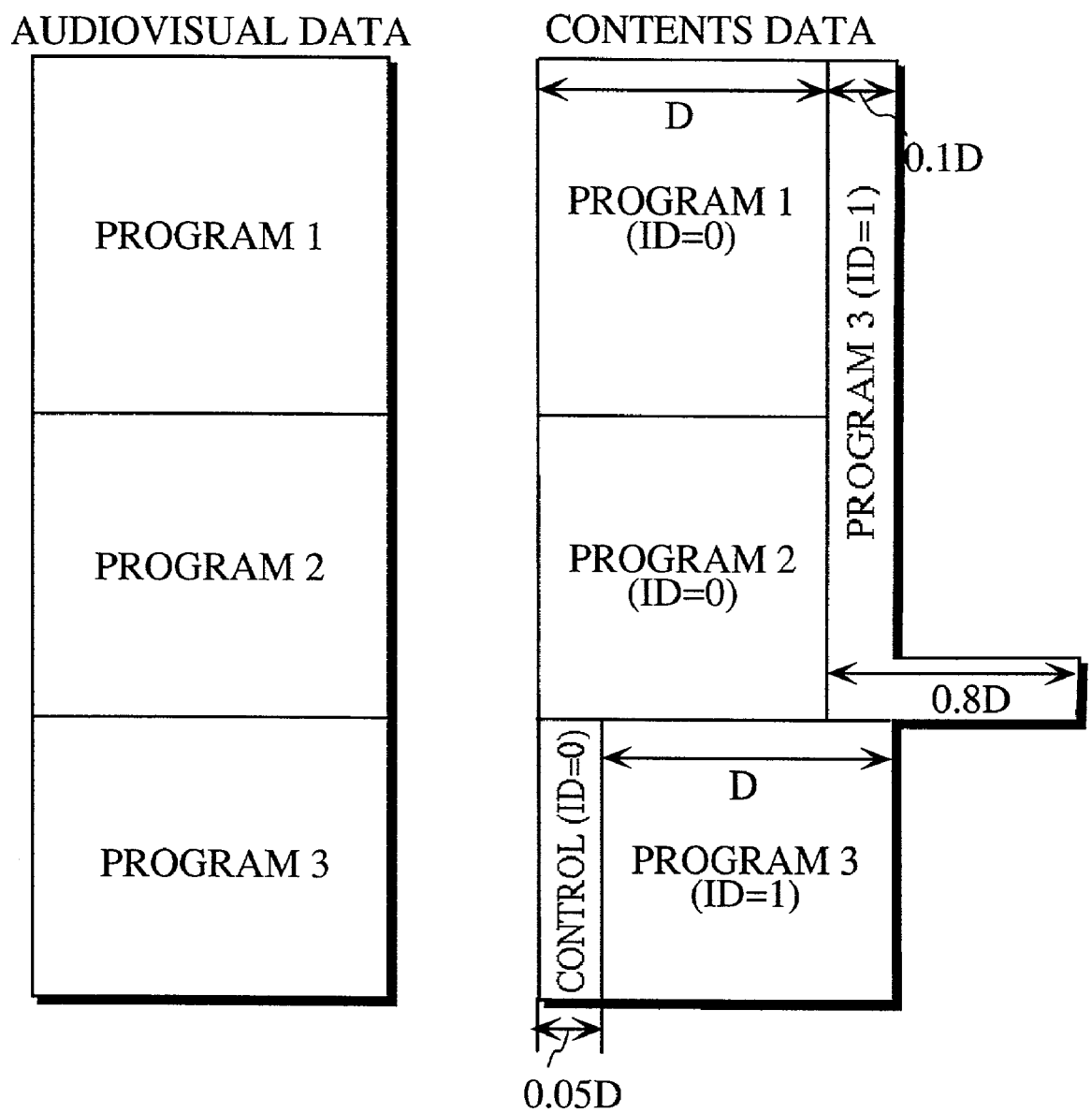
FIG. 30 shows an example in which the bandwidth for transmitting contents data is variable.

The above embodiments deal with the case where the total bandwidth for the contents data is a fixed bandwidth. However, the total bandwidth may be variable. FIG. 30 shows such an example. In this figure, the program 3 is the cache target program, contents data for control is transmitted at the bandwidth of 0.05D, and all of contents data for the programs in the reproduction period is always transmitted at the bandwidth D. Contents data for control for the cache target programs is transmitted using 0.1D in the first preceding transmission period and using 0.8D in the second preceding transmission period. In this case, the total bandwidth becomes one of 1.05D, 1.1D, and 1.8D and is not a fixed bandwidth.

(5) Starting Point of Transmission

In the first and the second embodiments, the starting point of transmission of the cache target programs are set at in common. However, the following modifications are applicable.

When one or more successive cache target programs make up a program block, the bandwidth for transmitting a program in the specific program block may be determined in the following manner.

Figure 31:
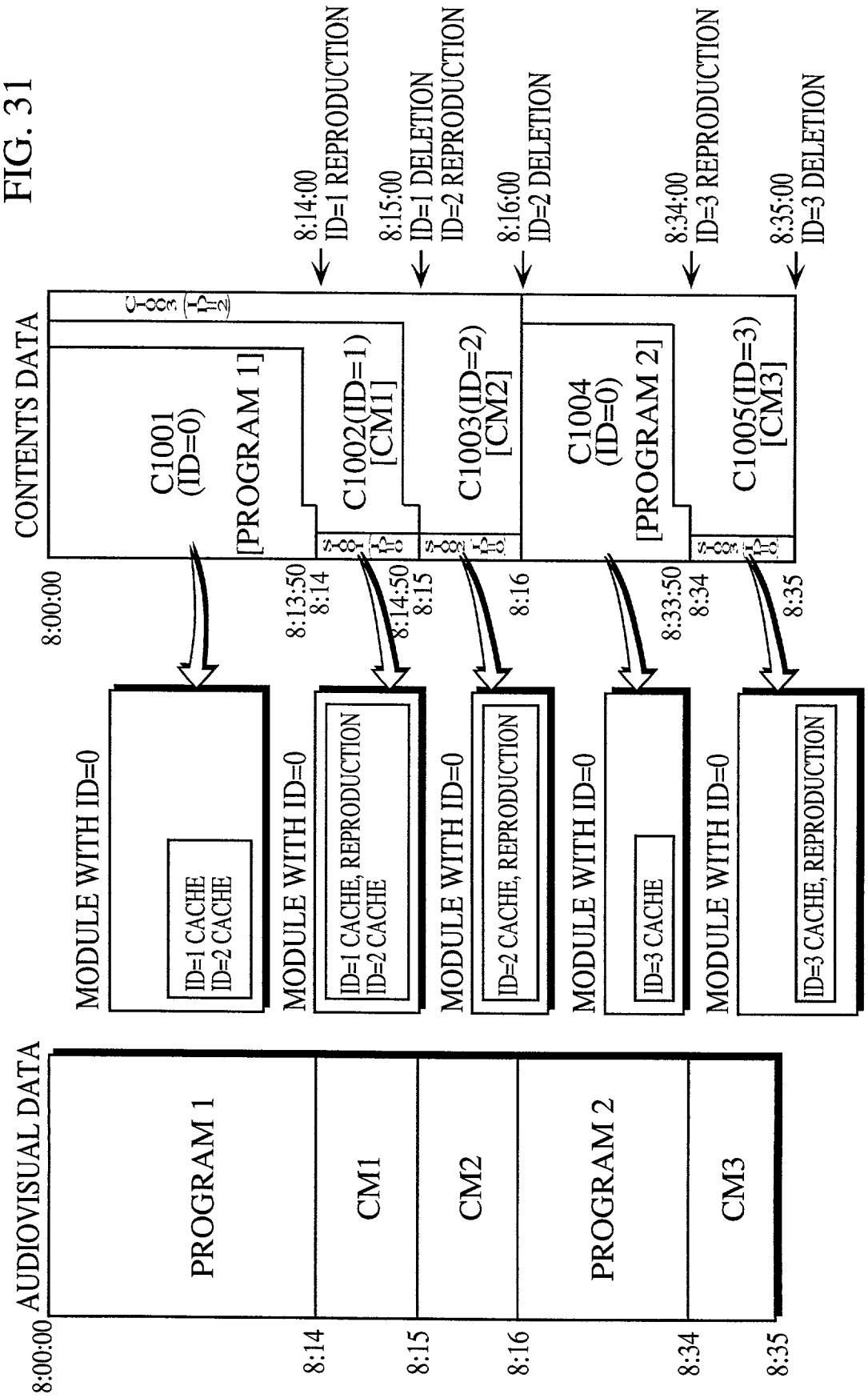
FIG. 31 shows an example of a contents transmission schedule.
Figure 32:
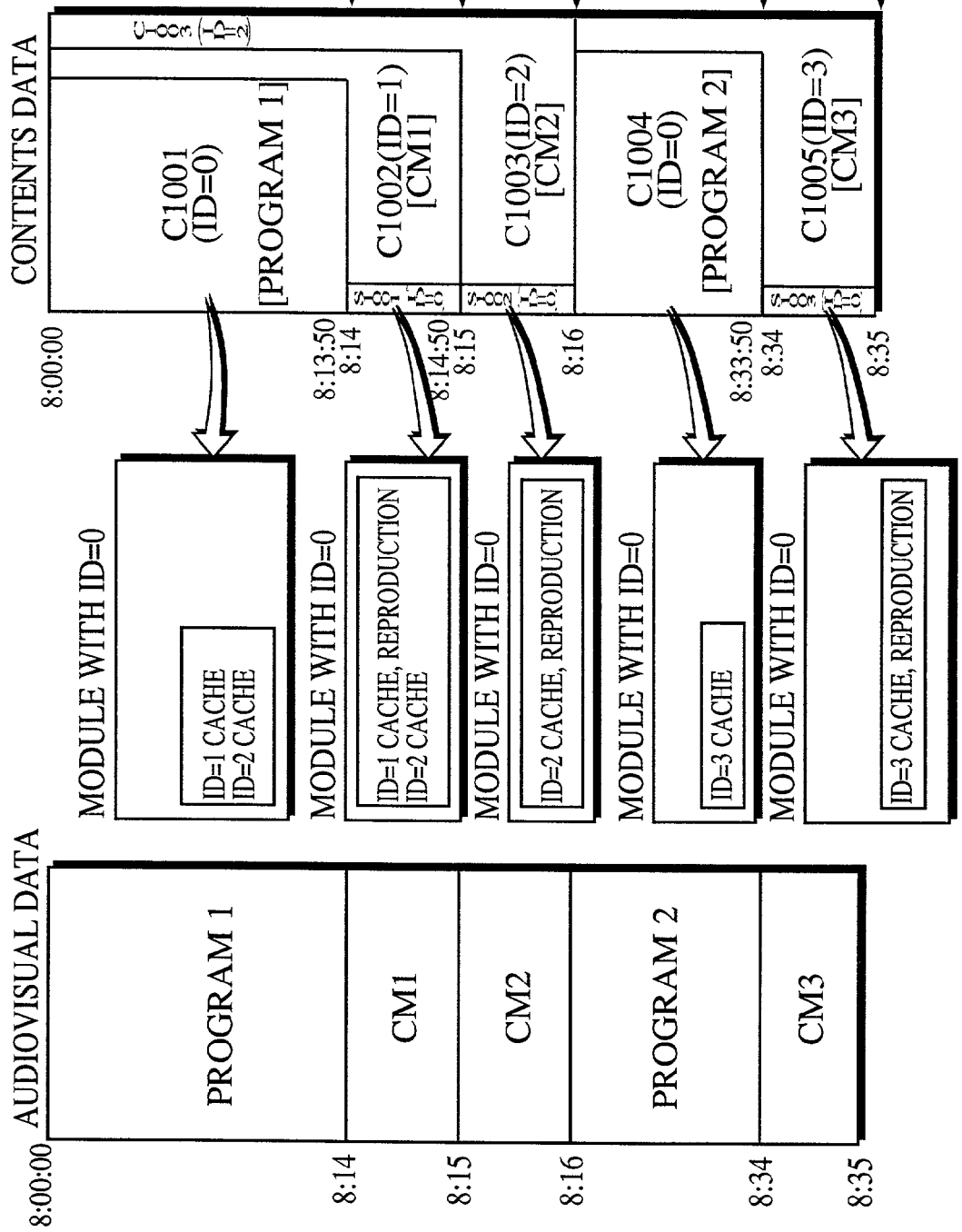
FIG. 32 shows an example of a contents transmission schedule.

That is, as shown in FIGS. 31 and 32, the finishing time of the last program in the preceding other program block is set at the first time, and the transmission bandwidth from the first time to the starting time of reproduction of the leading program in the specific program block is allocated to all of the programs in the specific program block, and the transmission bandwidth in the reproduction period of each program in the specific program block is allocated to each program and the following programs in the same program block.

Here, the first time may be any time in the reproduction period of the programs other than the cache target programs and which satisfies the condition so as not to interpose the other program blocks between the preceding program block and the specific program block.

In addition, the timing when the transmission bandwidth allotted to each program in the specific program block is changed from a narrow bandwidth to a broad bandwidth may be immediately before the starting time of reproduction of each program as shown in FIG. 31, or at the starting time of reproduction of each program.

(6) Cellular Phones, Internet, and So On

The invention is not limited to the broadcasting apparatus for the digital broadcast. For example, the invention is applicable to the broadcasting apparatus used for IP streaming broadcast which distributes program data via cable TV network, cellular phones network, and the like.

(7) Method, Program Recording Media, and Program

The invention may be the method which was described in the above embodiments, computer programs which have a computer realize such a method, and a computer readable receding medium on which the computer programs are recorded.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A broadcasting apparatus that broadcasts a specific program to which a reproduction time period between a starting time and a finishing time is specified, the reproduction being performed by a receiving apparatus, the broadcasting apparatus comprising:

an allotment unit operable to allot a broadcasting bandwidth for the reproduction time period to the specific program and allotting a part of the broadcasting bandwidth for a preceding time period immediately before the reproduction time period to the specific program and the other part of the broadcasting bandwidth to another program;

a transmission unit operable in accordance with the result of allotment by the allotment unit, for (a) repeatedly transmitting program data of the other program while transmitting program data of the specific program in the preceding time period, and (b) repeatedly transmitting the program data of the specific program in the reproduction time period, wherein to allotment unit sets a starting time of the preceding time period as a first time and a time included in between the first time and the starting time of the reproduction time period as a second time, the allotment unit (a) allots a broadcasting bandwidth not broader than a predetermined broadcasting bandwidth to the specific program from the first time to the second time, and (b) allots a broadcasting bandwidth broader than the predetermined broadcasting to the specific program from the second time to the finishing time of the reproduction time period; and a cache instruction message unit operable to repeatedly transmitting a cache instruction message at a time interval that is not longer than a transmission period of the program data of the specific program before the starting time of the reproduction time period of the specific program, wherein the cache instruction message unit instructs the receiving apparatus to cache the received program data of the specific program.

2. A broadcasting apparatus that broadcasts a specific program to which a reproduction time period between a starting time and a finishing time is specified, the reproduction being performed by a receiving apparatus, the broadcasting apparatus comprising:

an allotment unit operable to allot a broadcasting bandwidth for the reproduction time period to the specific program and allotting a part of the broadcasting bandwidth for a preceding time period immediately before the reproduction time period to the specific program and the other pat of the broadcasting bandwidth to another program;

a transmission unit operable in accordance with the result of allotment by the allotment unit, for (a) repeatedly transmitting program data of the other program while transmitting program data of the specific program in the preceding time period, and (b) repeatedly the program data of the specific program in the reproduction time period, wherein the allotment unit sets a starting time of the preceding time period as a first time and a time included in between the first time and the starting time of the reproduction time period as a second time; and the allotment unit (a) allots a broadcasting bandwidth not broader than a predetermined broadcasting bandwidth to the specific program from the first time to the second time, and (b) allots a broadcasting bandwidth broader than the predetermined broadcasting to the specific program from the second time to the finishing time of the reproduction time period;

a table data transmission unit operable to transmit table data before the starting time of the reproduction time period of the specific program, wherein the table data includes information on correspondences between instructions to cache, reproduce and delete the program data of the specific program and instruction IDs that are assigned for the instructions;

a first message transmission unit operable to transmit a first message before the starting time of the reproduction time period of the specific program, wherein the first message consists of an instruction ID that identifies the cache instruction and a program ID that identifies the program data of the specific program;

a second message transmission unit operable to transmit a second message at the starting time of the reproduction period of the specific program, wherein the second massage consists of an instruction ID that identifies the reproduction instruction and a program ID that identifies the program data of the specific program; and a third message transmission unit operable to transmit a third message at the finishing time of to reproduction time period of the specific program, wherein the third message consists of an instruction ID that identifies the deletion instruction and a program ID that identifies the program data of the specific program.

3. A broadcasting apparatus that broadcasts a specific program to which a reproduction time period between a starting time and a finishing time is specified, the reproduction being performed by a receiving apparatus, the broadcasting apparatus comprising:

an allotment unit operable to allot a broadcasting bandwidth for the reproduction time period to the specific program and allotting a part of the broadcasting bandwidth for a preceding time period immediately before the reproduction time period to the specific program and the other part of the broadcasting bandwidth to another program;

a transmission unit operable in accordance with the result of allotment by the allotment unit, for (a) repeatedly transmitting program data of the other program while transmitting program data of the specific program in the preceding time period, and (b) repeatedly transmitting the program data of the specific program in the reproduction time period, wherein the allotment unit sets a starting time of the preceding time period as a first time and a time included in between the first time and the starting time of the reproduction time period as a second time, and the allotment unit (a) allots a broadcasting bandwidth not broader than a predetermined broadcasting bandwidth to the specific program from the first time to the second time, and (b) allots a broadcasting bandwidth broader than to predetermined broadcasting to the specific program from the second time to the finishing time of the reproduction time period;

a table data transmission unit operable to transmit table data before the starting time of the reproduction time period of the specific program, wherein to table data includes information on correspondences between instructions to cache, reproduce, and delete the program data of the specific program and data IDs for identifying the instructions;

a first data transmission unit operable to transmit a first data before the starting time of the reproduction time period of the specific program, wherein the first data has a data ID which identifies the cache instruction as an instruction to be executed by the receiving apparatus;

a second data transmission unit operable to transmit a second data at the starting time of the reproduction time period of the specific program, wherein the second data has a data ID which identifies the reproduction instruction as an instruction to be executed by the receiving apparatus; and a third data transmission unit operable to transmit a third data at the finishing time of the reproduction time period of the specific program, wherein the third data has a data ID which identifies to deletion instruction as an instruction to be executed by the receiving apparatus.

4. A broadcasting method for broadcasting a specific program to which a reproduction time period between a starting time and a finishing time is specified, the reproduction being performed by a receiving apparatus, the broadcasting method comprising:

an allotment step for allotting a broadcasting bandwidth for the reproduction time period to the specific program and allotting a part of the broadcasting bandwidth for a preceding time period immediately before the reproduction time period to the specific program and the other part of the broadcasting bandwidth to another program;

a transmission step in accordance with the result of allotment by the allotment step, for (a) repeatedly transmitting program data of the other program while transmitting program data of the specific program in the preceding time period, and (b) repeatedly transmitting the program data of the specific program in the reproduction time period, wherein the allotment step sets a starting time of the preceding time period as a first time and a time included in between the first time and the starting time of the reproduction time period as a second time, the allotment step (a) allots a broadcasting bandwidth not broader than a predetermined broadcasting bandwidth to the specific program from the first time to the second time, and (b) allots a broadcasting bandwidth broader than the predetermined broadcasting to the specific program from the second time to the finishing time of the reproduction time period; and a cache instruction message step for repeatedly transmitting a cache instruction massage at a time interval that is not longer than a transmission period of the program data of the specific program before the starting time of the reproduction time period of the specific program, wherein the cache instruction message step instructs the receiving apparatus to cache the received program data of the specific program.

5. A program recording medium which is readable by a computer in a broadcasting apparatus, the broadcast apparatus broadcasts a specific program to which a reproduction time period between a starting time and a finishing time is specified, the reproduction being performed by a receiving apparatus, a computer program embodied on the program recording medium has the computer conduct the steps of:

an allotment step for allotting a broadcasting bandwidth for the reproduction time period to the specific program and allotting a part of the broadcasting bandwidth for a preceding time period immediately before the reproduction time period to the specific program and the other part of the broadcasting bandwidth to another program;

a transmission step in accordance with the result of allotment by the allotment step, far (a) repeatedly transmitting program data of the other program while transmitting program data of the specific program in the preceding time period, and (b) repeatedly transmitting the program data of the specific program in the reproduction time period, wherein the allotment step sets a starting time of the preceding time period as a first time and a time included in between the first time and the starting time of the reproduction time period as a second time, the allotment step (a) allots a broadcasting band width not broader than a predetermined broadcasting bandwidth to the specific program from the first time to the second time, and (b) allots a broadcasting bandwidth broader than the predetermined broadcasting to the specific program from the second time to the finishing time of the reproduction time period; and a cache instruction message step for repeatedly transmitting a cache instruction message at a time interval that is not longer than a transmission period of the program data of the specific program before the starting time of the reproduction time period of the specific program, wherein the cache instruction message step instructs the receiving apparatus to cache to received program data of the specific program.

6. A broadcasting method for broadcasting a specific program to which a reproduction time period between a starting time and a finishing time is specified, the reproduction being performed by a receiving apparatus, the broadcasting method comprising:

an allotment step for allotting a broadcasting bandwidth for the reproduction time period to the specific program and allotting a part of the broadcasting bandwidth for a preceding time period immediately before the reproduction time period to the specific program and the other part of the broadcasting bandwidth to another program;

a transmission step for, in accordance with the result of allotment by the allotment step, for (a) repeatedly transmitting program data of the other program while transmitting program data of the specific program in the preceding time period, and (b) repeatedly transmitting the program data of the specific program in the reproduction time period, wherein the allotment step sets a starting time of the preceding time period as a first time and a time included in between the first time and the starting time of the reproduction time period as a second time, and the allotment step (a) allots a broadcasting bandwidth not broader than a predetermined broadcasting bandwidth to the specific program from the first time to the second time, and (b) allots a broadcasting bandwidth broader than the predetermined broadcasting to the specific program from the second time to the finishing time of the reproduction time period;

a table data transmission step for transmitting table data before the starting time of the reproduction time period of the specific program, wherein the table data includes information on correspondences between instructions to cache, reproduce, and delete the program data of the specific program and instruction IDs that are assigned for the instructions;

a first message transmission step for transmitting a first message before the starting time of the reproduction time period of the specific program, wherein the first message consists of a instruction ID that identifies the cache instruction and a program ID that identifies the program data of the specific program;

a second message transmission step for transmitting a second message at the string time of the reproduction period of the specific program, wherein the second message consists of an instruction ID that identifies the reproduction instruction and a program ID that identifies the program data of the specific program; and a third message transmission step for transmitting a third message at the finishing time of the reproduction time period of the specific program, wherein the third message consists of an instruction ID that identifies the deletion instruction and a program ID that identifies the program data of the specific program.

7. A program recording medium which is readable by a computer in a broadcasting apparatus, the broadcast apparatus broadcasts a specific program to which a reproduction time period between a starting time and a finishing time is specified, the reproduction being performed by a receiving apparatus, a computer program embodied in the program recording medium has the computer conduct the steps of:

an allotment step for allotting a broadcasting bandwidth for the reproduction time period to the specific program and allotting a part of the broadcasting bandwidth for a preceding time period immediately before the reproduction time period to the specific program and the other part of the broadcasting bandwidth to another program;

a transmission step for, in accordance with the result of allotment by the allotment step, for (a) repeatedly transmitting program data of the other program while transmitting program data of the specific program in the preceding time period, and (b) repeatedly transmitting the program data of the specific program in the reproduction time period, wherein the allotment step sets a starting time of the preceding time period as a first time and a time included in between the first time and the starting time of the reproduction time period as a second time, and the allotment step (a) allots a broadcasting bandwidth not broader than a predetermined broadcasting bandwidth to the specific program from to first time to the second time, and (b) allots a broadcasting bandwidth broader than the predetermined broadcasting to the specific program from the second time to the finishing time of the reproduction time period;

a table data transmission step for transmitting table data before the starting time of the reproduction time period of the specific program, wherein the table data includes information on correspondences between instructions to cache, reproduce, and delete the program data of the specific program and instruction IDs that are assigned for the instructions;

a first message transmission step for transmitting a first message before the starting time of the reproduction time period of the specific program, wherein the first message consists of an instruction ID that identifies the cache instruction and a program ID that identifies the program data of the specific program;

a second message transmission step for transmitting a second message at the starting time of the reproduction period of the specific program, wherein the second message consists of an instruction ID that identifies the reproduction instruction and a program ID that identifies the program data of the specific program; and a third message transmission step for transmitting a third message at the finishing time of the reproduction time period of the specific program, wherein the third message consists of an instruction ID that identifies the deletion instruction and a program ID that identifies the program data of the specific program.

8. A broadcasting method for broadcasting a specific program to which a reproduction time period between a starting time and a finishing time is specified, the reproduction being performed by a receiving apparatus, the broadcasting apparatus comprising:

an allotment step for allotting a broadcasting bandwidth for the reproduction time period to the specific program and allotting a part of the broadcasting bandwidth for a preceding time period immediately before the reproduction time period to the specific program and the other part of the broadcasting bandwidth to another program;

a transmission step, in accordance with the result of allotment by the allotment step, for (a) repeatedly transmitting program data of the other program while transmitting program data of the specific program in the preceding time period, and (b) repeatedly transmitting the program data of the specific program in the reproduction time period, wherein the allotment step sets a starting time of the preceding time period as a first time and a time included in between the first time and the starting time of the reproduction time period as a second time, and the allotment step (a) allots a broadcasting bandwidth not broader than a predetermined broadcasting bandwidth to the specific program from the first time to the second time, and (b) allots a broadcasting bandwidth broader than the predetermined broadcasting to the specific program from the second time to the finishing time of the reproduction time period;

a table data transmission step for transmitting table data before the starting time of the reproduction time period of the specific program, wherein the table data includes information on correspondences between instructions to cache, reproduce, and delete the program data of the specific program and data IDs for identifying the instructions;

a first data transmission stop for transmitting a first data before the starting time of the reproduction time period of the specific program, wherein the first data has a data ID which identifies the cache instruction as an instruction to be executed by the receiving apparatus;

a second data transmission step for transmitting a second data at the starting time of the reproduction time period of the specific program, wherein the second data has a data ID which identifies the reproduction instruction as an instruction to be executed by the receiving apparatus; and a third data transmission step for transmitting a third data at the finishing time of the reproduction time period of to specific program, wherein the third data has a data ID which identifies the deletion instruction as an instruction to be executed by the receiving apparatus.

9. A program record medium which is readable by a computer in a broadcasting apparatus, the broadcast apparatus broadcasts a specific program to which a reproduction time period between a starting time and a finishing time is specified, the reproduction being performed by a receiving apparatus, a computer program embodied in the program recording medium has the computer conduct the steps of:

an allotment step for allotting a broadcasting bandwidth for the reproduction time period to the specific program and allotting a part of the broadcasting bandwidth for a preceding time period immediately before the reproduction time period to the specific program and the other part of the broadcasting bandwidth to another program;

a transmission stop, in accordance with the result of allotment by the allotment step, for (a) repeatedly transmitting program data of the other program while transmitting program data of the specific program in the preceding time period, and (b) repeatedly transmitting the program data of the specific program in the reproduction time period, wherein the allotment step sets a starting time of the preceding time period as a first time and a time included in between the first time and the starting time of the reproduction time period as a second time, and the allotment step (a) allots a broadcasting bandwidth not broader than a predetermined broadcasting bandwidth to the specific program from the first time to the second time, and (b) allots a broadcasting bandwidth broader than the predetermined broadcasting to the specific program from the second time to the finishing time of the reproduction time period;

a table data transmission step for transmitting table data before the starting time of the reproduction time period of the specific program, wherein the table data includes information on correspondences between instructions to cache, reproduce, and delete the program data of the specific program and data IDs for identifying the instructions;

a first data transmission step for transmitting a first data before the starting time of the reproduction time period of the specific program, wherein the first data has a data ID which identifies the cache instruction as an instruction to be executed by the receiving apparatus;

a second data transmission step for transmitting a second data at the starting time of the reproduction time period of the specific program, wherein the second data has a data ID which identifies the reproduction instruction as an instruction to be executed by the receiving apparatus; and a third data transmission step for transmitting a third data at the finishing time of the reproduction time period of the specific program, wherein the third data has a data ID which identifies the deletion instruction as an instruction to be executed by the receiving apparatus.

* * * * *

UNITED STATES PATENT AND TRADEMARK OFFICE
CERTIFICATE OF CORRECTION

PATENT NO. : 7,096,482 B2
APPLICATION NO. : 09/901258
DATED : August 22, 2006
INVENTOR(S) : Fujita et al.

It is certified that error appears in the above-identified patent and that said Letters Patent is hereby corrected as shown below:

In the Claims:

Column 38, line 43, "to" should be --the--.
Column 39, line 6, "pat" should be --part--.
Column 39, line, insert --transmitting-- after "repeatedly".
Column 40, line 12, "to" should be --the--.
Column 40, line 17, "to" should be --the--.
Column 40, line 37, "to" should be --the--.
Column 41, line 26, "far" should be --for--.
Column 41, line 36, "band width" should be one word --bandwidth--.
Column 41, line 50, "to" should be --the--.
Column 42, line 29, "string" should be --starting--.
Column 44, line 1, "stop" should be --step--.
Column 44, line 15, "to" should be --the--.

Signed and Sealed this

Twenty-third Day of January, 2007

JON W. DUDAS
*Director of the United States Patent and Trademark Office*